US009426651B2

(12) United States Patent
Kim et al.

(10) Patent No.: US 9,426,651 B2
(45) Date of Patent: Aug. 23, 2016

(54) METHOD FOR PROVIDING CONTENTS IN A MOBILE COMMUNICATION SYSTEM AND APPARATUS THEREOF

(75) Inventors: Yon-Hee Kim, Seoul (KR); Tae-Ho Oh, Seoul (KR); Young-In Cha, Seoul (KR); Gi-Seon Nam, Seongnam-si (KR); O-Hyon Kwon, Seoul (KR)

(73) Assignee: SK PLANET CO., LTD., Seongnam-si, Gyeonggi-do (KR)

( * ) Notice: Subject to any disclaimer, the term of this patent is extended or adjusted under 35 U.S.C. 154(b) by 2098 days.

(21) Appl. No.: 11/573,865

(22) PCT Filed: Aug. 18, 2005

(86) PCT No.: PCT/KR2005/002726
§ 371 (c)(1),
(2), (4) Date: Nov. 13, 2007

(87) PCT Pub. No.: WO2006/019275
PCT Pub. Date: Feb. 23, 2006

(65) Prior Publication Data
US 2008/0194231 A1 Aug. 14, 2008

(30) Foreign Application Priority Data

Aug. 18, 2004 (KR) .......................... 10-2004-0065111
Aug. 19, 2004 (KR) .......................... 10-2004-0065483
Aug. 20, 2004 (KR) .......................... 10-2004-0065844
Aug. 24, 2004 (KR) .......................... 10-2004-0066909
Sep. 23, 2004 (KR) .......................... 10-2004-0076299
Oct. 28, 2004 (KR) .......................... 10-2004-0086521

(51) Int. Cl.
*H04M 1/00* (2006.01)
*H04W 12/06* (2009.01)
(Continued)

(52) U.S. Cl.
CPC ............... *H04W 12/06* (2013.01); *H04L 63/08* (2013.01); *H04L 67/04* (2013.01); *H04L 67/06* (2013.01); *H04W 4/00* (2013.01); *H04W 74/00* (2013.01)

(58) Field of Classification Search
CPC ....... H04L 63/08; H04L 67/04; H04W 12/06; H04W 4/00; H04W 74/00; H04W 67/06
See application file for complete search history.

(56) References Cited

U.S. PATENT DOCUMENTS

2002/0057678 A1* 5/2002 Jiang et al. ..................... 370/353
2002/0191795 A1* 12/2002 Wills ............................. 380/270
(Continued)

FOREIGN PATENT DOCUMENTS

JP 2002-259396 9/2002
JP 2002-342659 11/2002
(Continued)

OTHER PUBLICATIONS

Korean Office Action for 10-2004-0065844.
(Continued)

*Primary Examiner* — Ajit Patel
(74) *Attorney, Agent, or Firm* — Hauptman Ham, LLP

(57) ABSTRACT

Disclosed is a method for providing contents in a mobile communication system and apparatus thereof. The apparatus comprises a contents provider access unit for responding to an inquiry request related to a service provision using contents providing terminal connected through a communication network and managing a rule related to the contents providing terminal and a connection and an inquiry request of the contents providing terminal; a central management unit for managing a predetermined service, a subscriber affiliated with the service, apparatus information of a subscriber terminal and an operation and an authentication of the service based on a data inputted from a contents providing terminal connected through the contents provider access unit; a transmission unit for receiving terminal information of a subscriber affiliated with the service and transmitting a menu of the service and contents in accordance with an apparatus of many piece of the terminal information of a subscriber affiliated with the service; and an interface unit for performing an interface with an external server interlocked with the service, providing the service and the contents and managing a rule to the external server.

32 Claims, 23 Drawing Sheets

(51) Int. Cl.
*H04L 29/06* (2006.01)
*H04L 29/08* (2006.01)
*H04W 4/00* (2009.01)
*H04W 74/00* (2009.01)

(56) References Cited

U.S. PATENT DOCUMENTS

| | | | |
|---|---|---|---|
| 2003/0120593 A1* | 6/2003 | Bansal et al. | 705/39 |
| 2004/0098609 A1* | 5/2004 | Bracewell et al. | 713/200 |
| 2004/0176067 A1* | 9/2004 | Lakhani et al. | 455/406 |
| 2004/0214572 A1* | 10/2004 | Thompson et al. | 455/435.2 |
| 2005/0210249 A1* | 9/2005 | Lee et al. | 713/168 |
| 2006/0053090 A1* | 3/2006 | Cotter et al. | 707/3 |
| 2006/0129816 A1* | 6/2006 | Hinton | 713/169 |
| 2007/0088837 A1* | 4/2007 | Gidron et al. | 709/228 |

FOREIGN PATENT DOCUMENTS

| | | |
|---|---|---|
| KR | 1020000059081 | 10/2000 |
| KR | 1020020018986 | 3/2002 |
| KR | 1020020079133 | 10/2002 |
| KR | 1020030030586 | 4/2003 |
| KR | 1020030039844 | 5/2003 |
| KR | 1020040060018 | 7/2004 |
| WO | 02/067167 | 8/2002 |

OTHER PUBLICATIONS

Korean Office Action for 10-2004-0066909.
International Search Report for PCT/KR2005/002726.
International Search Report mailed Dec. 7, 2005 for PCT/KR2005/002726.

* cited by examiner

Fig. 7

| | CONTENT MANAGEMENT | ⊖ CONTENT & HANDSET URI COMBINATION | | | | PAGE NUMBER(S) 1 OF 1 |
|---|---|---|---|---|---|---|
| | | TOTAL NUMBER OF SEARCH RESULT : 4 | | | | |
| ⊟ CONTENT & HANDSET URI COMBINATION MANAGEMENT | | NO | CONTENT & HANDSET URI COMBINATION ID | CONTENT & HANDSET URI COMBINATION ID | ASSOCIATED HANDSET URI | ASSOCIATED CP MANAGEMENT |
| • CONTENT & HANDSET URI COMBINATION | | 1 | 1 | WAP | HTTP://WWW.SKREPOSITORY/XXX.RDF | WAP-SIMPLE  MODIFY DELETE |
| • COMBINE SERVICE & PHONE TYPE | | 2 | 2 | TESTING | HTTP://WWW.SKREPOSITORY/XXX.RDF | DOWNLOAD-SIMPLE  MODIFY DELETE |
| ⊞ MENU OPERATION TEAM MGMT | | 3 | 3 | SSSSSS | HTTP://WWW.SKREPOSITORY/XXX.RDF | DOWNLOAD-SIMPLE  MODIFY DELETE |
| | | 4 | 4 | SSSSSSSDSF | | WAP-SIMPLE |

Fig. 10

METHOD FOR PROVIDING CONTENTS IN A MOBILE COMMUNICATION SYSTEM AND APPARATUS THEREOF

CROSS REFERENCE TO RELATED APPLICATIONS

This application is the National Phase application of International Application No. PCT/KR2005/002726, filed Aug. 18, 2005, which designates the United States and was published in English. This application, in its entirety, is incorporated herein by reference.

TECHNICAL FIELD

The present invention relates to a mobile communication system and, more particularly, to a method for providing contents in a mobile communication system and an apparatus thereof that a mobile communication system operator provides a subscriber terminal with a data service using contents provided by a contents provider.

BACKGROUND ART

Owing to recent developments for mobile terminals, the mobile terminal is not just a means for providing a voice communication any more. Particularly, a wireless terminal having a WAP (Wireless Application Protocol) function actively accesses a gateway for accessing information a user wishes to use. The user can obtain important information such as a flight time, bell sound, a game and a real-time stock market price, etc., through the wireless terminal having a WAP.

A mobile network operator has to satisfy an individual request of a content provider for providing a service subscriber and a wireless terminal of the service subscriber or a wired terminal with contents in order to correspond to various service requests mentioned above.

In order to satisfy an individual request of a content provider, the mobile network operator has to provide a service subscriber of a wireless terminal with a client personalization service, an intuitive and an accessible user interface, security, convenient access, fast access to contents and a quality use of time.

Also the mobile network operator has to provide a content provider with a platform that follows regulations, can be expanded, satisfies requirements of a present content provider and applies to a progressive business and a technical circumstance rapidly and effectively.

In addition, because a conventional wireless internet service method and/or system thereof enable respective dispersed individual servers to provide a separate service, an individual contents provider can provide a subscriber with special and individualized contents.

But there has been a problem that a wireless communication operator, who shares, within a communication network, the individual contents providers and information of subscribers affiliated with the communication network, has to individually manage individualized contents providers.

At this time, a tool, with which a plurality of contents providers can conveniently provide contents services, is needed. One-stop management of a plurality of contents providers that are individually managed and their service provision is strongly desired.

In addition, a mobile terminal is used for an information acquisition, an internet search and a game, etc. This is the reason why various wireless internet connection functions are added, and most of various contents, which mobile communication operators or contents providers joining with them provide, are provided through a wireless internet based on wireless application protocol.

But because most terminals used for wireless internet access is mainly manufactured as a voice communication terminal at this point, the terminal has been miniaturized and is light-weight. Accordingly, because a size of screen is minimized, the number of selection items included in each menu is fewer and a depth of total menu is deeply designed.

Therefore, because only a low menu of an identical layer is displayed on a screen, selection of a specific low menu and movement to a desired menu is easy. However, a user has to repeatedly select a menu key or a shortcut key and thus move to a high menu in order to move to a specific high menu.

In addition, there has been a problem that because WAP menus displayed on a screen of a mobile terminal have a user interface based on text and thus all users are provided with a menu having an identical form, the form is monotonous and thus it is difficult of all user to easily sense content of menus.

Because a terminal using a wireless internet has various functions at this point, it is difficult to provide a service so as to fit for a function of any one terminal.

As an example, there is a problem that a form of a menu is monotonous and it is difficult for all users to easily sense content of menus in the case of providing all users with a WAP menu displayed on a screen of a mobile terminal in accordance with a function of an older terminal as a menu form generated based on a text.

In addition, there has been generated a problem that a menu generated by previous terminal supporting only a browser for a text in case of generating a menu using a view type of various layouts and items so as to fit for a function of a terminal providing multimedia contents.

In general, an internet mainly uses a wired (cable) connection method. A use of a wired internet is performed on an open network without paying. In some cases of using a pay contents, a fee is paid through an identification of ID on a wired internet.

In case of an internet communication using a wired connection, HTTP (Hyper Text Transfer Protocol) performs a communication between an internet server and a client by using a fixed network cable, and provides a fixed IP (Internet Protocol; referred to as IP hereinafter) address. Accordingly, after the internet server realizes an IP address of a user who wishes to access the internet server and use an internet contents service and then performs an authentication process identifying a user name and password, etc, the internet server maintains a communication with the user by using a method such as a session and a cookie, etc.

The cookie is a provisional file including information generated in the case that a client accesses a predetermined homepage, and a size of the cookie is less than 4 Kb.

Originally, the cookie is generated for helping a homepage connection of internet users. If a user visits a predetermined site initially, a cookie registering an ID and a password is generated. If the user subsequently visits the predetermined site, the user rapidly accesses the predetermined site by using the cookie. The cookie can be generated and renewed by a web browser connected to the internet, and transfers a record thereof to a contents providing unit.

But a mobile terminal connected with a wireless internet connection has a limited storage capability and thus cannot connect easily with a wireless internet connection. And in case of providing a contents provider or an external server with a mobile terminal connected with a portal platform for integrating and managing a wired internet connection or wireless internet, encryption for preventing release of client information is highly needed.

Lastly, in case of being affiliated with a wireless internet connection like an affiliation of a wired internet connection, a predetermined affiliation process has to be performed. Namely, there are many data inputs requested in the case that a subscriber visits a terminal agent or registers a subscriber's name, an address, a social security number, a business registry number, a desired ID and a secret number in accordance with the ID by accessing a wireless internet connection.

Furthermore, data input is difficult because a screen and a keypad of a mobile terminal are miniaturized. Additionally, there is a problem that a user has to perform a sticky affiliation process in the case that the user, who uses a mobile terminal having a WAP function but isn't affiliated with a wireless internet provider, wishes to use a wireless internet connection.

DISCLOSURE OF INVENTION

Technical Problem

Accordingly, it is an object of the present invention to provide a mobile communication system including a method for providing contents in a mobile communication system and apparatus thereof enabling a mobile communication system operator to perform a one-stop management for a contents provider, and moreover enabling the contents provider to conveniently provide a service with the mobile terminal.

Technical Solution

It is a first aspect of the present invention to provide an apparatus for providing contents in a mobile communication system, the apparatus comprising: a contents provider access unit for responding to an inquiry request related to a service provision using a contents providing terminal connected through a communication network and managing a rule related to the contents providing terminal and a connection and request of the contents providing terminal; a central management unit for managing a predetermined service, a subscriber affiliated with the service, apparatus information of a subscriber terminal and an operation and an authentication of the service based on a data inputted from a contents providing terminal connected through the contents provider access unit; a transmission unit for receiving terminal information of a subscriber affiliated with the service and transmitting a menu of the service and contents in accordance with an apparatus of many pieces of the terminal information of a subscriber affiliated with the service; and an interface unit for performing an interface with an external server configured for interoperability with the service, providing the service and the contents and managing a rule to the external server.

It is a second aspect of the present invention to provide an apparatus for providing contents in a mobile communication system, the apparatus comprising: a connection detection module for detecting apparatus information and subscriber information of the mobile terminal connected with the central management unit; a basic information collection module for checking a kind of the service and a menu in accordance with the kind of the service; and a rendering module for filtering a menu in accordance with the apparatus information of the menus and then transmitting the filtered menu to the mobile terminal.

It is a third aspect of the present invention to provide an apparatus for providing contents in a mobile communication system, the apparatus comprising: a connection detection module for detecting subscriber information of the mobile terminal in the case that the mobile terminal is connected with an integrating and managing apparatus; a terminal management module for managing apparatus information corresponding to subscriber information of the mobile terminal; a segment management module for managing a segment for providing contents with the mobile terminal in accordance with a predetermined rule by an operator and adjusting a layout of a menu in the segment; a menu management module for adjusting a browser type of the mobile terminal and a displayer form of the menu in the menu; and a rendering module, wherein the rendering module transmits a menu in accordance with the apparatus information to the mobile terminal by enabling the mobile terminal to receive a menu corresponding to the segment and to receive apparatus information from the terminal management module.

It is a fourth aspect of the present invention to provide an apparatus for providing contents in a mobile communication system, the apparatus comprising: a connection detection module for extracting subscriber information and apparatus information of many pieces of information received from a mobile terminal connected through a wireless communication network and transmitting the same; and an authentication module for receiving client information and deciding an authentication thereof, and storing the client during a predetermined time in the case that the authentication is completed.

It is a fifth aspect of the present invention to provide a method for providing contents in a mobile communication system, the method comprising the steps of: A) generating terminal group information by classifying apparatus information of the mobile terminal in accordance with a predetermined rule; B) generating a contents-apparatus information by connecting contents with corresponding terminal group information in case of storing the contents to be provided for the mobile terminal; C) connecting the contents-apparatus information with a menu item and storing the same in case of generating a menu of a wireless internet portal to be provided for the mobile terminal; D) storing a menu layout of the wireless internet portal as a file form; E) managing a segment for adjusting a layout stored as a file form in the segment classified for providing contents with the mobile terminal in accordance with a predetermined rule; and F) adjusting a displayer form of respective items of the menu provided in the mobile terminal through the segment in accordance with the apparatus information.

It is a sixth aspect of the present invention to provide a method for providing contents in a mobile communication system, the method comprising the steps of: Si) connecting with an integrating and managing apparatus managing a wireless internet connection of the mobile terminal; S2) detecting apparatus information of the connected mobile terminal, and searching a kind of a service to be provided for the mobile terminal; and S11) reading a menu in accordance with the kind of the service, filtering a menu matched with apparatus information of the mobile terminal of the menu and then transmitting the same to the mobile terminal.

It is a seventh aspect of the present invention to provide a method for providing contents in a mobile communication system, the method comprising the steps of: X-i) searching a segment and a browser type affiliated by a mobile terminal in the case that the mobile terminal connects with an integrating and managing apparatus for managing an operation of a wireless internet; and X-ii) transmitting a menu adjusted by the searched segment and a view type of the menu in accordance with a browser type of the mobile terminal to the mobile terminal.

It is an eighth aspect of the present invention to provide a method for providing contents in a mobile communication system, the method comprising the steps of: Y-1) adjusting a view type of respective items provided for a mobile terminal in accordance with a browser type of the mobile terminal; Y-2) searching apparatus of a mobile terminal in the case that the mobile terminal connects with a wireless internet connection; and Y-3) searching a browser type of the mobile terminal included in the apparatus information, and transmitting the menu having a view type adjusted in accordance with the browser type to the mobile terminal.

It is a ninth aspect of the present invention to provide a method for providing contents in a mobile communication system, the method comprising the steps of: T-1) searching a layer of a present menu provided for the mobile terminal through a communication network; T-2) searching an icon corresponding to a menu item of a most significant layer in the case that the a layer (K) of the present menu is more than a second layer and belongs to a last layer (Y) provided by an operator; and T-3) displaying a most significant layer inside of an area allotted in a WAP page except for an icon linked with the present menu of the icons of the most significant layer.

It is a tenth aspect of the present invention to provide a method for providing contents in a mobile communication system, the method comprising the steps of: W-1) searching subscriber information of client information of the mobile terminal connected with a wireless internet connection; W-2) performing an authentication of the subscriber information; W-2) transmitting an inquiry message as to whether to be affiliated with a wireless internet subscriber to the mobile terminal in the case that a subscriber has authentication privileges but didn't register to a wireless internet in the authenticating result; and W-4) automatically affiliating with a wireless internet in the case that a terminal of the subscriber receives an agreement message of an affiliation with a wireless internet.

It is an eleventh aspect of the present invention to provide an automatic authentication method in a wireless internet, the method comprising the steps of: Q-i) connecting a mobile terminal with a proxy server for connecting with a wireless internet through a wireless communication network; Q-ii) extracting client information including apparatus information and subscriber information of the mobile terminal connected with the central management unit and then transmitting the same to an authentication server; Q-iii) determining whether the client information is provided with the authentication server; and Q-iv) performing an authentication of the client information in the case that the determining result doesn't satisfy the condition of the step (Q-Iii) and storing then the authenticated client information at a predetermined memory.

Advantageous Effects

As described above, the present invention can provide management which provides a subscriber of a wireless terminal with a client personalization service, an intuitive and an accessible user interface, an authenticity of security, convenient access, fast access to contents and a use of qualitative time.

In addition, according to the present invention, a visual monotony can be overcome by providing a mobile terminal with a layout of various menus and a view type and a user can easily sense a content of the menu. And a convenience of a menu use is enhanced by displaying a most significant menu in a predetermined area in case of displaying on a screen of a mobile terminal.

Moreover, according to the present invention, needless web surfing can be reduced by providing a menu differently in accordance with an efficiency of a mobile terminal, and an inconvenience is resolved that only after a user of a mobile terminal accesses a wireless internet and selects desired contents, the user can reproduce the selected contents through his/her mobile terminal.

In addition, according to the present invention, because client information of a mobile terminal authenticated in a wireless internet can be maintained during a predetermined time, a time loss in accordance with the authentication and a system load can be reduced. And a release of client information is prevented beforehand by respectively encrypting subscriber information and apparatus information and transmitting the same to a contents providing terminal or an external server.

According to the present invention, mobile network operator provides contents providers with a platform that is on the basis of a rule, can expand, can satisfy items requested from a present contents providers and can be effectively and rapidly applied to an ongoing business and technical circumstances.

BRIEF DESCRIPTION OF THE DRAWINGS

These and/or other aspects and advantages of the invention will become apparent and more readily appreciated from the following description of the preferred embodiments, taken in conjunction with the accompanying drawings of which:

FIGS. 6 through 10 illustrate an interior block diagram of a web page provided from an integrating and managing apparatus in accordance with an embodiment of the present invention;

Figure 1:
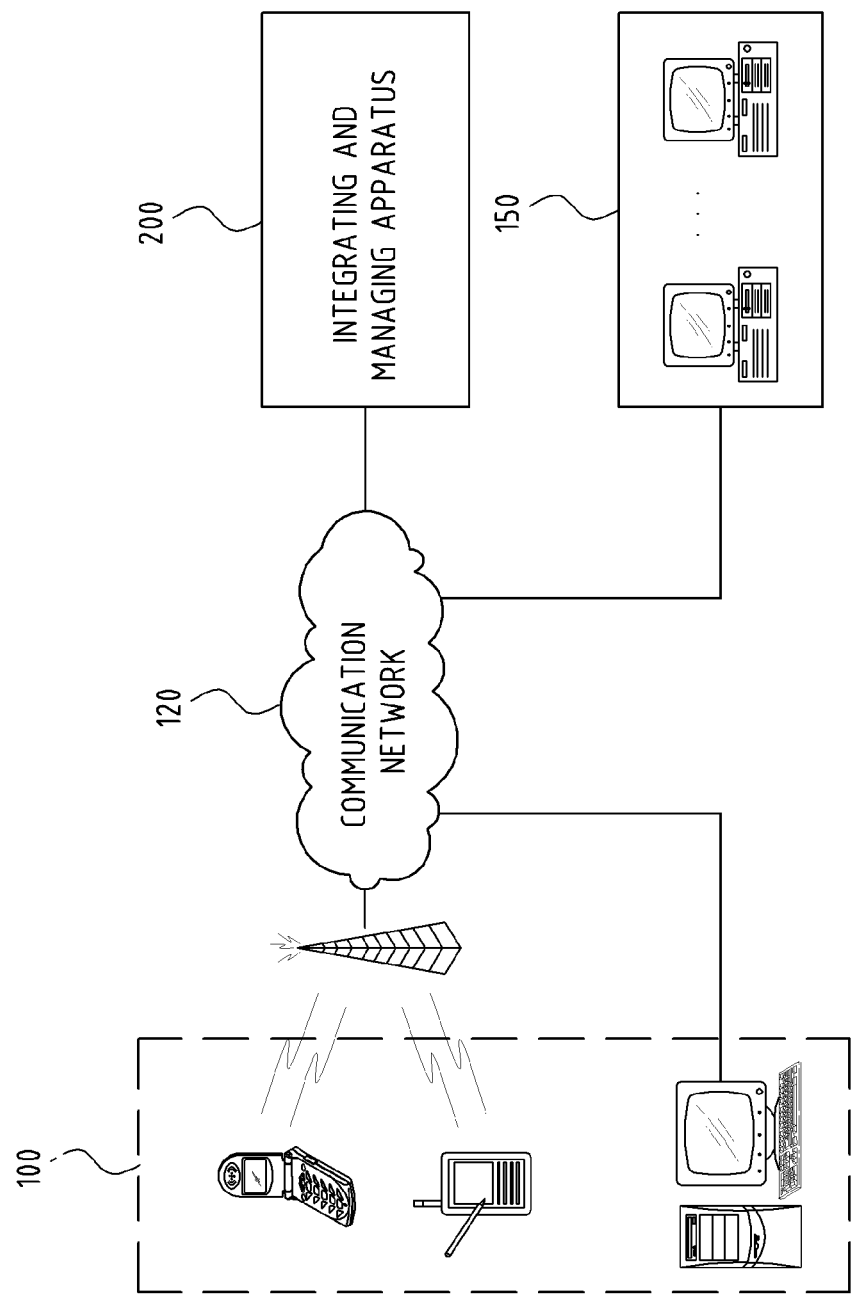
FIG. 1 illustrates a block diagram of a system for providing contents from a mobile communication system in accordance with an embodiment of the present invention.

The following Examples are given for the purpose of illustration only and are not intended to limit the scope of this invention.

BEST MODE FOR CARRYING OUT THE INVENTION

Hereinafter, preferable embodiments according to the present invention will be described with reference to the accompanying drawings. Here, when one element is connected to another element, one element may be not only directly connected to another element but also indirectly connected to another element via another element. Further, irrelevant elements are omitted for clarity. Also, like reference numerals refer to like elements throughout.

Referring to FIGS. 1 to 27, a preferable embodiment will be described in more detail.

FIG. 1 illustrates a block diagram of a system for providing contents from a mobile communication system in accordance with an embodiment of the present invention.

Referred to FIG. 1, a mobile communication system in accordance with the present invention comprises a communication network 120 and an integrating and managing apparatus 200, and further comprises a subscriber terminal 100, a content providing terminal 150 and an external server 170.

The communication network 120 includes a wired network and a wireless network, and respectively connects the subscriber terminal 100, the content providing terminal 150 and the external server 170.

The subscriber terminal 100 includes a cellular phone performing a wireless communication, a mobile terminal including a PDA and a computer performing a wired communication.

The subscriber terminal 100 in accordance with an embodiment of a mobile terminal is a mobile terminal, the subscriber terminal 100 will be explained by limiting to a mobile terminal for the convenience of a following explanation and reference numerals of mobile terminal is identically disclosed. However, the subscriber terminal 100 is not limited to a mobile terminal.

Content providers in accordance with the present invention are operators who wish to provide the subscriber terminal 100 with a service including an application program and contents composed of various data.

The integrating and managing apparatus 200 has an open framework including a content provider access unit, a central management unit, a transmission unit and an interface unit, and thus is a portal platform having adaptability and a modularity, which can be embodied together with another solution.

Also the integrating and managing apparatus 200 supports a worldwide standard related to a wireless business such as a WAP (Wireless Application Protocol).

And also the integrating and managing apparatus 200 enables the content provider to rapidly start a service by integrating and managing data in accordance with the content provider, a service and contents of the content provider and a menu of the content provider. Moreover, the integrating and managing apparatus 200 provides an authority model based on a service based subscription and CP (Contents Provider) policy.

The integrating and managing apparatus 200 provides a search engine for a mobile terminal and a web page so as to perform a search using a code and a search in accordance with a keyword by a subscriber's mobile terminal.

The content providing terminal 150 is endowed with an account from the integrating and managing apparatus 200 through the communication network 120 and registers a service to be provided by the subscriber terminal 100. And the content providing terminal 150 provides the subscriber terminal 100 with position information contents and an option that the contents can be embodied.

In one example, an operator of the mobile communication system 300 manages the content providing unit 150. The content providing unit 150 is done by grouping and operated in accordance with a kind of a service, and stores and manages contents in accordance with the service. At this time, the integrating and managing apparatus 200 enables the content providing terminal 150 to provide the subscriber terminal 100 with the service. Namely, the integrating and managing apparatus 200 performs total management for providing contents.

The integrating and managing apparatus 200 is connected with the external server 170, and the external server 170 includes a billing server and a short message server, etc.

FIGS. 2 through 5 illustrate a simplified internal block diagram of an integrating and managing apparatus in accordance with an embodiment of the present invention in FIG. 1.

Figure 2:
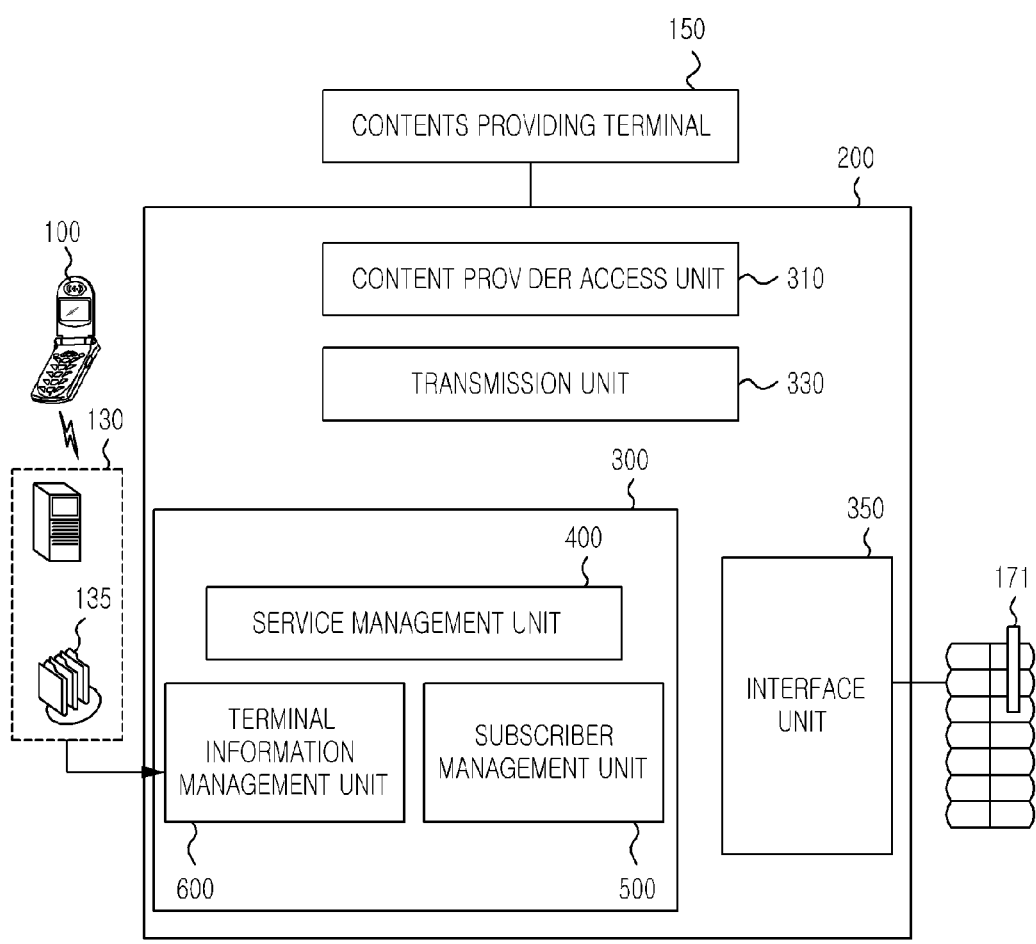
FIGS. 2 through 5 illustrate a simplified internal block diagram of an integrating and managing apparatus in accordance with an embodiment of the present invention in FIG. 1.

As depicted in FIG. 2, the integrating and managing apparatus 200 comprises a contents provider access unit 310, a central management unit 300, a transmission unit 330 and an interface unit 350.

The contents provider access unit 310 provides the content providing terminal 150 with a connection interface in order that the content providing terminal 150 can be connected with the integrating and managing apparatus 200. The connection interface provides authentication of the connected contents providing terminal 150 and communicates with the authenticated contents providing terminal 150 in accordance with a predetermined rule.

In addition, the contents provider access unit 310 responds to an inquiry request of information related to a service such as a subscriber's profile, etc., affiliated with the service requested by the contents providing terminal 150, and manages a connection of the contents providing terminal 150, the inquiry request and a rule related to the contents provider. Additionally speaking, the contents provider access unit 310 provides authentication with the contents providing terminal 150 connected through the communication network 120, and provides a connection interface for communicating with the authenticated contents providing terminal 150 in accordance with a predetermined rule.

In case of be connected with the contents provider access unit 310, a predetermined plug-in is provided for the contents providing terminal 150 in accordance with a connection control management rule. In addition, a plug-in of an existing system can is used in the integrating and managing apparatus 200 through an asynchronous interface.

Furthermore, the contents provider access unit 310 requests an inquiry item inputted from the contents providing terminal 150 connected to the integrating and managing apparatus 200. One example of the inquiry item is a profile of a service subscriber and apparatus information of a subscriber terminal, etc. In addition, the contents provider access unit 310 manages a rule related to the contents provider.

Accordingly, as the contents providing terminal 150 connects with the contents provider access unit 310 and then registers a service for being provided for subscriber terminal 100 in the integrating and managing apparatus 200, the service is managed through the integrating and managing apparatus 200.

The central management unit 300 comprises a service management unit 400 for managing a service of contents providers, a subscriber management unit 500 for managing a subscriber affiliated with the service, a terminal information management unit 600 for managing terminal related information of the subscriber and a management unit (not shown) for managing other service operation and an authentication.

The central management unit 300 is configured for interoperability with the transmission unit 330, and comprises a transmission interface (not shown) forming a transmission channel with the subscriber terminal 100 and a management unit (not shown) for managing information requested for a transmission.

In addition, the interface unit 350 comprises an interface connection unit 352 for communicating with an external server 170 working with the integrating and managing apparatus 200 and an interface management unit 354 for performing an interface management. The interface connection unit 352 is able to transmit/receive a predetermined data by having a protocol in accordance with the external server 170 and being directly connected with the external server 170. And also the interface unit 350 manages a configuration of the external server 170.

For example, the interface unit 350, in case of servicing a short message by being connected with a short message service server (which is one example of the external server), stores and manages a billing data in accordance with a provision of the short message according to the service rule and periodically transmits the same to a billing server that is another external server 170.

In another applied example, the interface unit 350 periodically provides a billing server with billing data by storing and managing the billing data when the interface unit 350 provides the predetermined service or the contents in accordance with a service provision request of the authenticated subscriber terminal.

Figure 3:
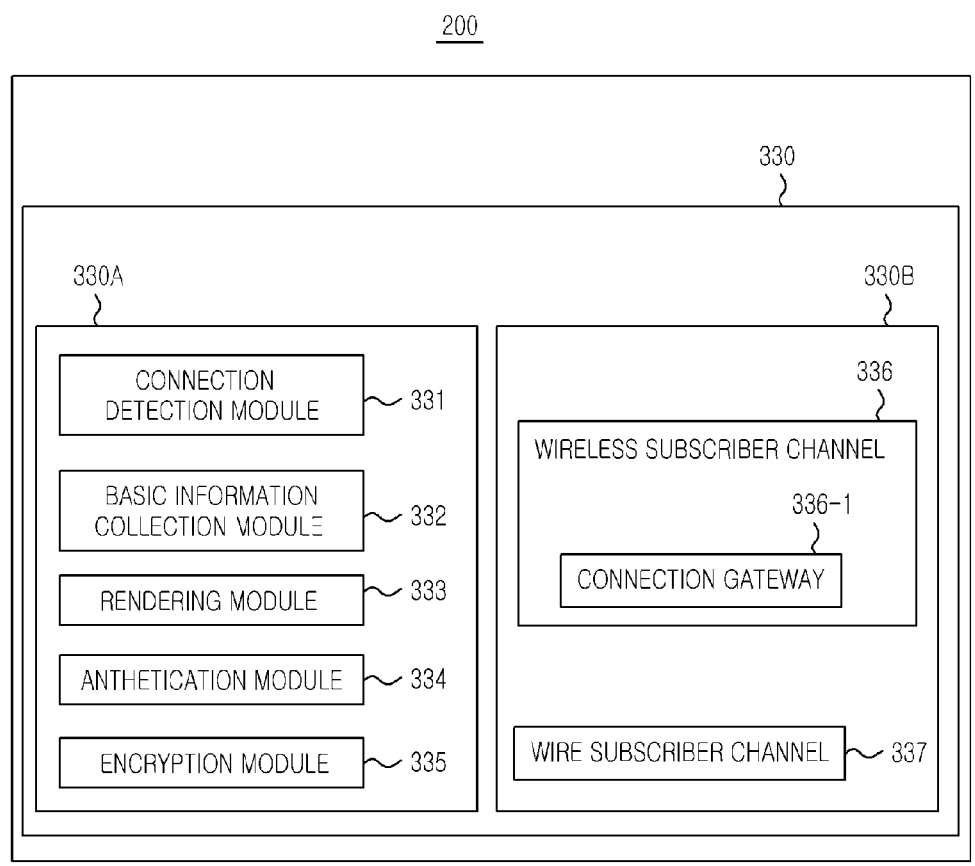

FIG. 3 illustrates a detailed block diagram of a transmission unit of an integrating and managing apparatus in accordance with an embodiment of the present invention.

Referred to FIG. 3, the transmission unit 330 comprises a transmission management unit 330A and a transmission channel 330B.

The transmission management unit 330A comprises a connection detection module 331, a basic information collection module 332, a rendering module 333, and an authentication module 334 and an encryption module 335. Functions of transmission management unit 330A include obtaining client information of the subscriber terminal affiliated with the integrating and managing apparatus 200 through the communication network 120 and authenticating the same, and extracting apparatus information of many piece of the client information and transmitting the same to the central management unit 300.

The connection detection module 331 detects apparatus information and subscriber information of the mobile terminal connected with the integrating and managing unit 200 through a wireless internet connection.

The basic information collection module 332 searches a kind of the service affiliated by a user of the mobile terminal 100 based on the subscriber information detected from the connection detection module 331. Namely, the basic information collection module 332 searches which segment the user is affiliated with. In addition, the basic information collection module 332 reads a menu supported in the segment. In an applied example, the basic information collection module 332 provides a history menu of the subscriber terminal by storing a menu selected by the subscriber terminal during a predetermined time.

The rendering module 333 filters a menu in accordance with the apparatus information of the menus read based on information collected from the basic information collection module 332. The rendering module 333 then transmits the filtered menu to the mobile terminal 100. In addition, the rendering module 333 converts the menu into a layout (or template) and/or a view type of menu items in accordance with the terminal information and transmits the same to the mobile terminal 100. The rendering module 333 stores a predetermined program to embody various layouts of a menu.

An example of various layouts of a menu is depicted in FIGS. 18 through 24.

Figure 19:
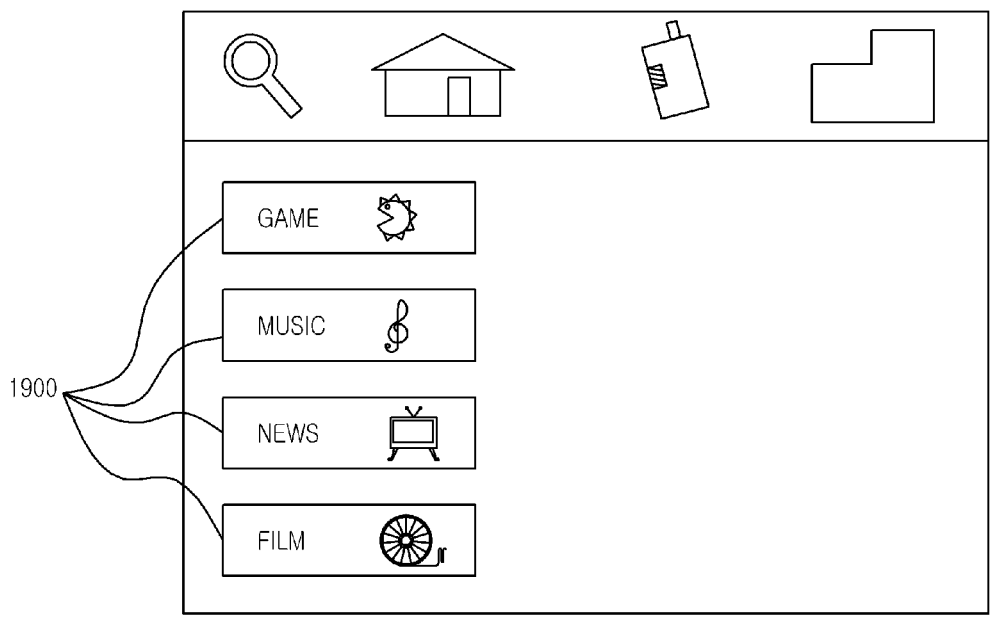
FIGS. 19 through 24 illustrate an exemplary menu provided for a mobile terminal in accordance with an embodiment of the present invention.
Figure 21:
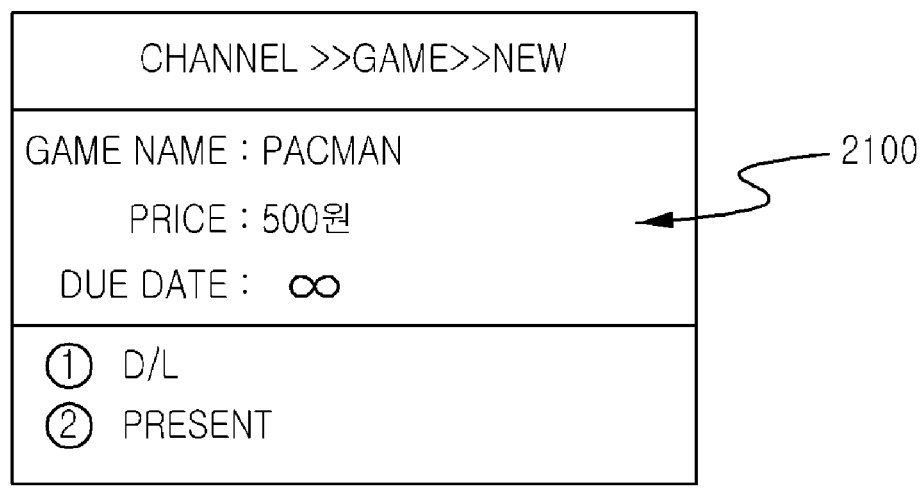
Figure 22:
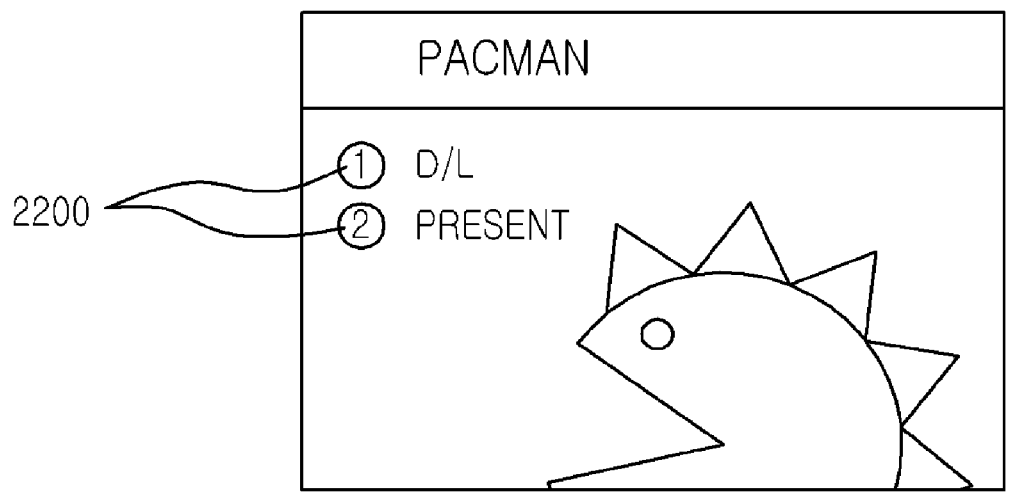
Figure 23:
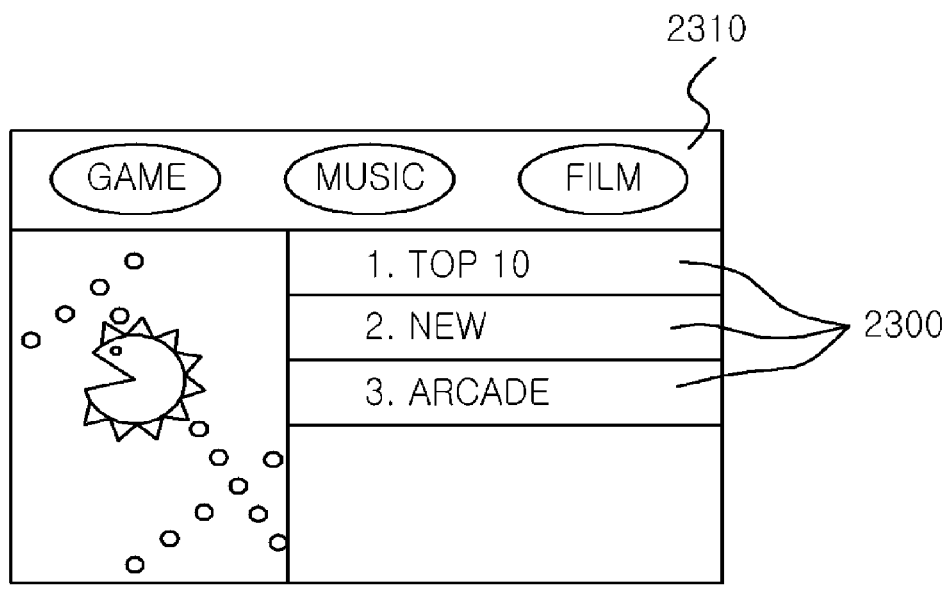
Figure 24:
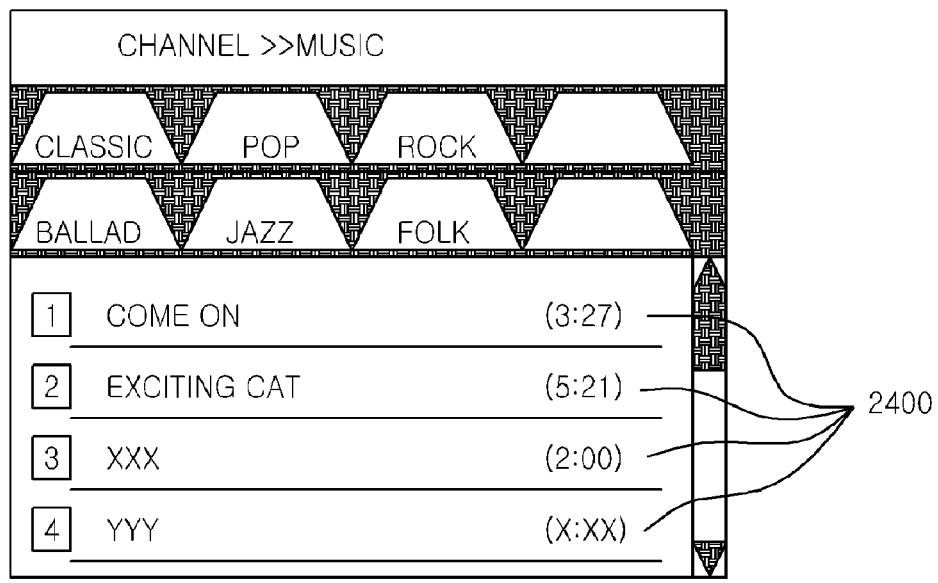
Figure 25:
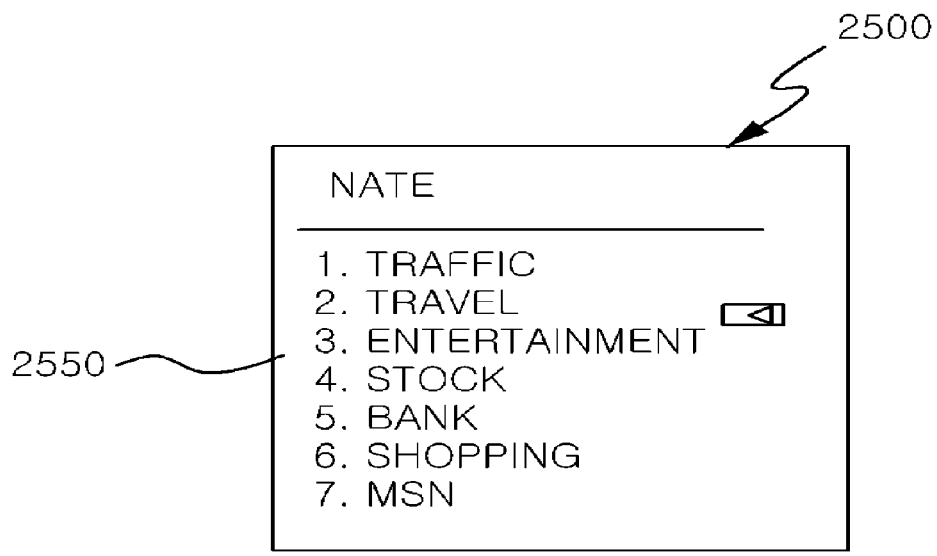
FIGS. 25 through 27 illustrate another exemplary menu provided for a mobile terminal in accordance with an embodiment of the present invention.

In addition, various view types embodied as respective items of a menu are stored as a predetermined program. The view type includes a text type 2100 as depicted in FIG. 21, an index type 2200 and 2300 as depicted in FIGS. 22 through 23, an index under bar type 2400 as depicted in FIG. 24 and a pictogram type 1900 as depicted in FIG. 19, etc.

The authentication module 334 performs an authentication for discriminating whether a connected subscriber terminal has authentication privileges based on subscriber information and apparatus information detected from the connection detection module 331. The subscriber information is any one of an MIN (Mobile Identification Number; referred to as "MIN" hereinafter), an MDN (Mobile Directory Number; referred to as "MDN" hereinafter) and client information, and the apparatus information is a phone type or a URI (Unique Resource Identity; referred to as "URI" hereinafter).

The authentication module 334 determines a condition as to whether the client information is required, and provisionally stores the client information at a predetermined memory location in case of being a requirement in the authenticating result. A user can change the time stored at the memory.

The authentication module 334 omits an authentication of the client information in the case that the received client information is stored at the memory, but client information of a mobile terminal, which is re-connected after the time adjusted by a user lapses, has to be again authenticated because the subscriber information is stored at the memory for a specific timeframe.

The encryption module 335 converts the subscriber information and the apparatus information into a predetermined format in the case that the subscriber information and the apparatus information is not a formation defined in an OMA (Open Mobile Alliance; referred to as "OMA" hereinafter) standard. Namely, the encryption module 335 converts the client information into a predetermined code using a plug-in method.

The transmission channel unit 330B provides the authenticated subscriber terminal with the service menu generated in accordance with the apparatus information and contents of the subscriber terminal obtained from the transmission management unit 330A, transmits/receives through a wireless subscriber channel 336 in the case that the subscriber is a mobile terminal, and transmits/receives through a wired subscriber channel 337 in the case that the subscriber is a wired terminal.

The wired subscriber channel 337 registers a user history connected through a log, as in a log file, but the wireless subscriber channel 336 does not have a log file generation function. Accordingly, in the present invention, the connection gateway 336-1 generates a predetermined cookie based on apparatus information of client information of a subscriber terminal connected through a wireless network and performs user agent processing for protecting the client information.

Figure 4:
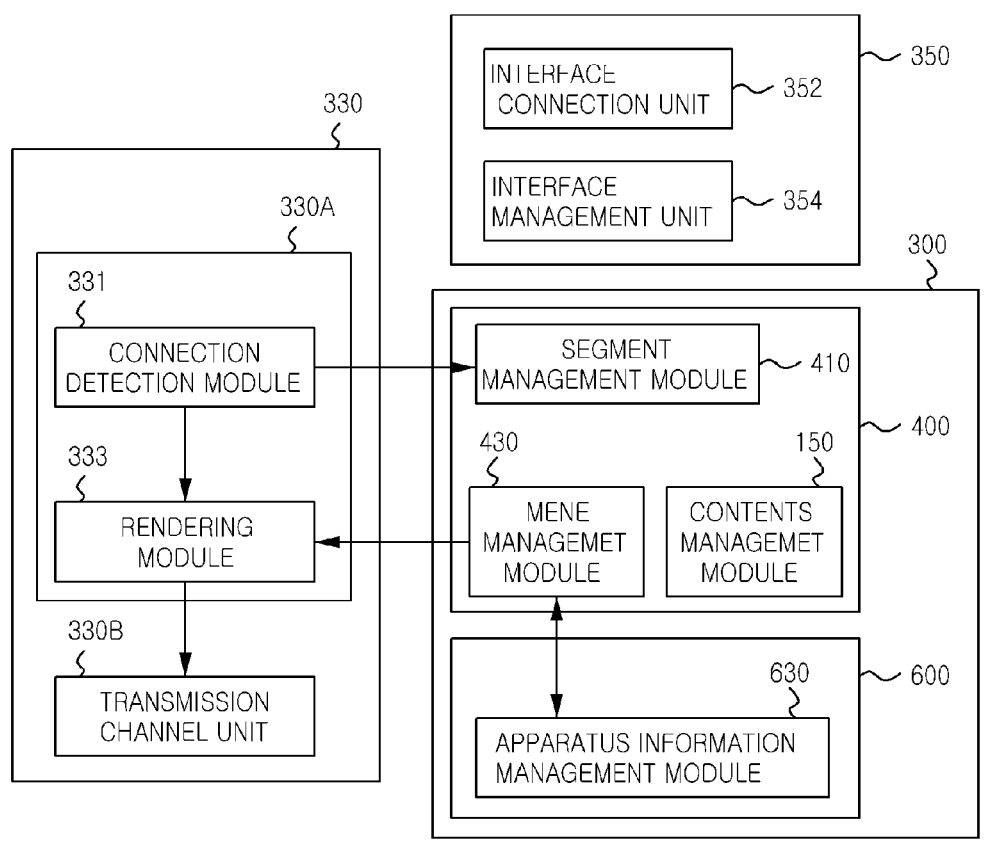
Figure 5:
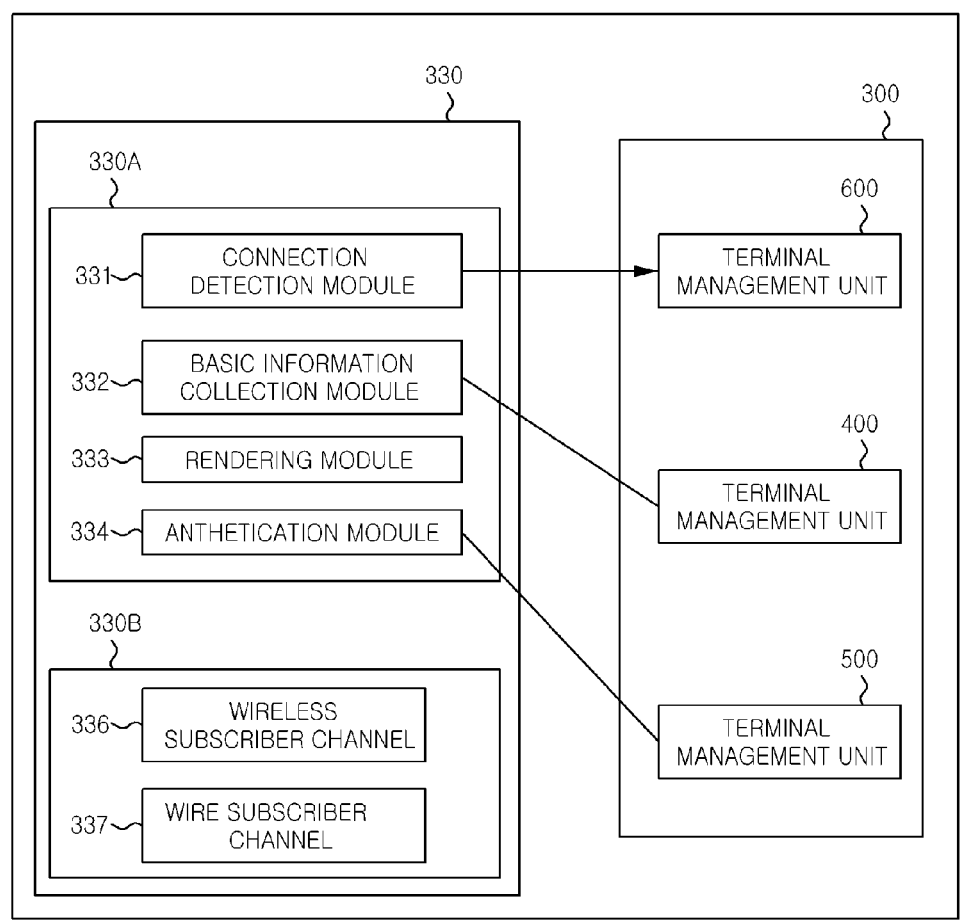

FIGS. 4 through 5 illustrates a detailed block diagram of a central management unit configured for interoperability with a transmission unit of an integrating and managing apparatus in accordance with an embodiment of the present invention.

The central management unit 300 comprises a service management unit 400, a subscriber management unit 500, a terminal management unit 600 and a search engine (not shown).

The service management unit 400 comprises a segment management module 410, a menu management module 430 and a contents management module 450. The segment is a service group generated by an operator in accordance with a predetermined rule, and a user of a mobile terminal is provided with a service for downloading contents through the segment. In addition, an operator can form a segment group by grouping more than two segments.

The segment management module 410 can detect which segment is a user of the mobile terminal affiliated by storing a segment or a segment group corresponding to subscriber information. And the segment management module 410 stores information supported by the segment and for which layout the menu is displayed.

The menu management module 430 manages a browser type of the mobile terminal and a view type of the menu.

The contents management module 450 is connected with the contents provider access unit 310 of the integrating and managing apparatus 200. The contents management module 450 receives position information (namely, a contents entry point) to be provided for the mobile terminal 100 from the contents providing terminal 150 registering an account and registers the same. At this time, the contents management module 450 stores option information of a mobile terminal to be embodied and apparatus information thereof by contents provider. Namely, the contents management module 450 generates contents-apparatus information (contents & handset URI combination) that connects apparatus information generated and classified by the terminal group information management module 610 with contents information.

Contents provided for the mobile terminal 100 are stored at the contents providing terminal or a predetermined database, and are not stored at the integrating and managing apparatus 200. Thus, the contents providing terminal 150 directly provides the contents with the mobile terminal 100 in the case that a contents request from the mobile terminal is transferred to the contents providing terminal 150 through the integrating and managing apparatus 200.

A mobile network operator (referred to as "operator" hereinafter) generates a menu of a wireless internet portal to be provided for a mobile terminal from the menu management module 440 based on the contents connection point registered by the contents providing terminal 150.

Additionally speaking, apparatus information is added to a menu by registering the contents-apparatus information (contents & handset URI combination) generated from the contents management module 450 in case of registering the menu.

The subscriber management unit 500 comprises a web subscriber management module and a WAP subscriber management module.

The web subscriber management module stores and manages subscriber information affiliated with a wired internet connection, and the WAP subscriber management module stores and manages subscriber information affiliated with a wireless internet connection.

In addition, in the case that a user of a mobile terminal connected with a wireless internet requests an affiliation with the wireless internet connection, the subscriber management unit 500 and the connection detection module 331 use subscriber information and apparatus information as data for a registering request in the case of registering. A subscriber name, an address, a social security number, ID and a password, etc., are substituted for a provisional data provided from the subscriber management unit 500.

Subscriber information affiliated with a wired internet connection or a wireless internet connection through a terminal agency is transmitted to subscriber management unit 500 through a rule related server which is an external server 170.

The terminal management unit 600 comprises a terminal group information management module 610 and an apparatus information management module 630.

The terminal management unit 600 manages apparatus information of all kinds of a mobile terminal, and especially the terminal group information management module 610 classifies and stores a terminal having an identical function. At this time, the identical function of a terminal represents a grade of picture quality (whether to be a high picture quality or not), the number of a tones supported by sound of the mobile terminal and a memory volume of the mobile terminal. One example of the terminal classification is a mobile terminal that has a high picture quality and a camera, a mobile terminal that has a high picture quality and 64 tones and a mobile terminal that is black and white and 64 tones.

A search engine (not shown) searches contents desired by a subscriber at a predetermined database in accordance with a contents request message received from a subscriber terminal and transmits the same. In case of not existing at the predetermined database, the search engine requests the contents providing terminal 150 to transmit the contents to the subscriber terminal 100.

An operation of the present invention composed as mentioned above will be explained.

FIGS. 11 through 17 are a flow chart illustrating a method for providing contents through integrating and managing apparatus in accordance with an embodiment of the present invention.

Figure 11:
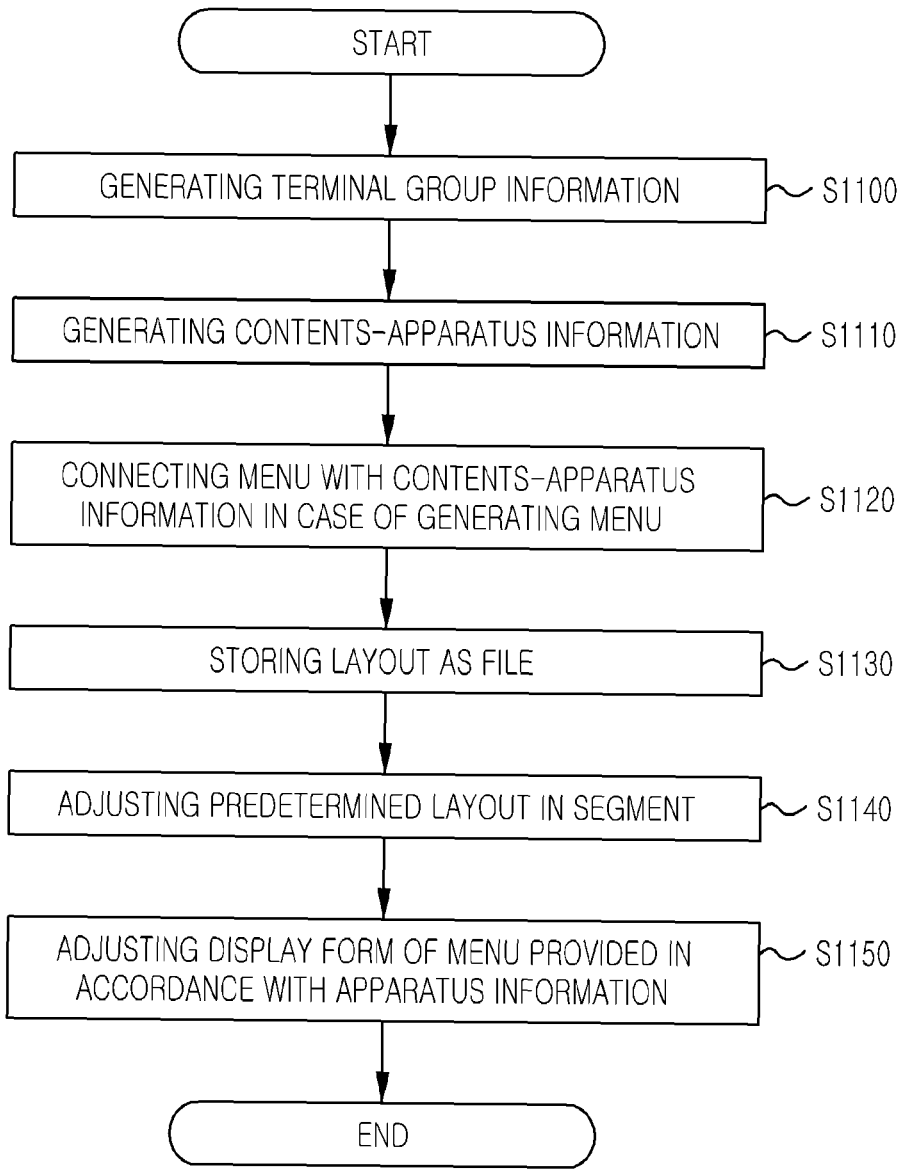
FIGS. 11 through 18 are a flow chart illustrating a method for providing contents through integrating and managing apparatus in accordance with an embodiment of the present invention.

FIG. 11 is a flow chart illustrating a menu adjustment process of apparatus information of a mobile terminal in accordance with an embodiment of the present invention.

A mobile terminal 100 classifies the apparatus information in accordance with a predetermined rule and then generates terminal group information (S1100).

At this time, a classification of the apparatus information in accordance with the predetermined rule is performed by a screen size of the mobile terminal, the number of colors supported from the mobile terminal, whether to be a mobile terminal having a camera or not, the number of a tones supported by the sound capabilities of the mobile terminal and a memory built-in, etc., and can be modified by an operator.

Information of contents is registered through the contents management module 420 of the integrating and managing apparatus 200 in the case that a contents provider provides a service the mobile terminal 100 through the integrating and managing apparatus 200. Namely, a contents provider registers a URL (Uniform Resource Locater) at which the contents are located together with a contents name or an ID. At this time, the contents provider also registers an option of a mobile terminal that the contents can be embodied.

Additionally, contents-apparatus information of terminal group information generated in the step (S1100) is selected and then generated in case of registering the contents (S1110).

Figure 6:
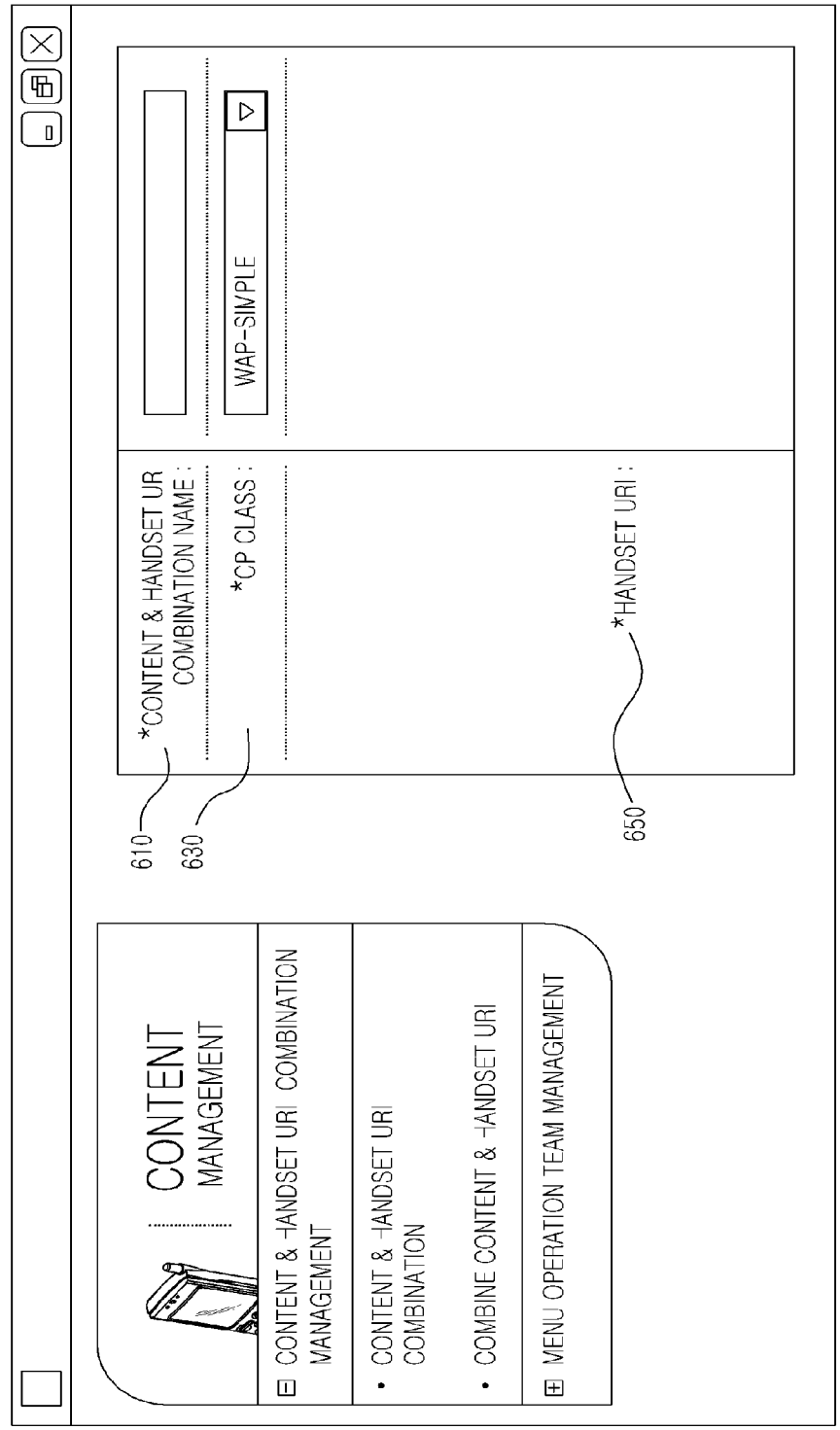
Figure 8:

A web page in FIG. 6 is one embodiment generating the contents-apparatus information. As depicted in FIG. 6, at least one of a handset URI 650 at which characteristic of a mobile terminal are stored is selected in a CP (Contents Provider) class 630 classifying contents in accordance with the characteristic, and then is generated by booking a name of the contents-apparatus information. The contents-apparatus information is registered as an RDF file in the terminal information management unit 600 of the integrating and managing apparatus 200. A list of the generated contents-apparatus information is depicted in FIG. 7.

An operator generates a menu of a wireless internet portal to be provided for the mobile terminal 100 connected with the wireless internet. The menu comprises a directory menu with which a contents connection menu, which is position information, cannot be connected and a CP entry menu embodied so as to be connected with the contents connection menu.

A menu is provided in accordance with apparatus information by connecting a directory menu of the menus with the contents-apparatus information (S1120).

In addition, after a layout of a menu provided for the mobile terminal is generated by an operator, it is stored as a file type (S1130).

An operator can adjust any one of the stored layouts in case of generating and/or modifying (S1140). If a layout is adjusted in a segment, a menu has a layout and is displayed on a screen in the case a mobile terminal affiliated with the segment accesses a wireless internet connection.

Figure 20:
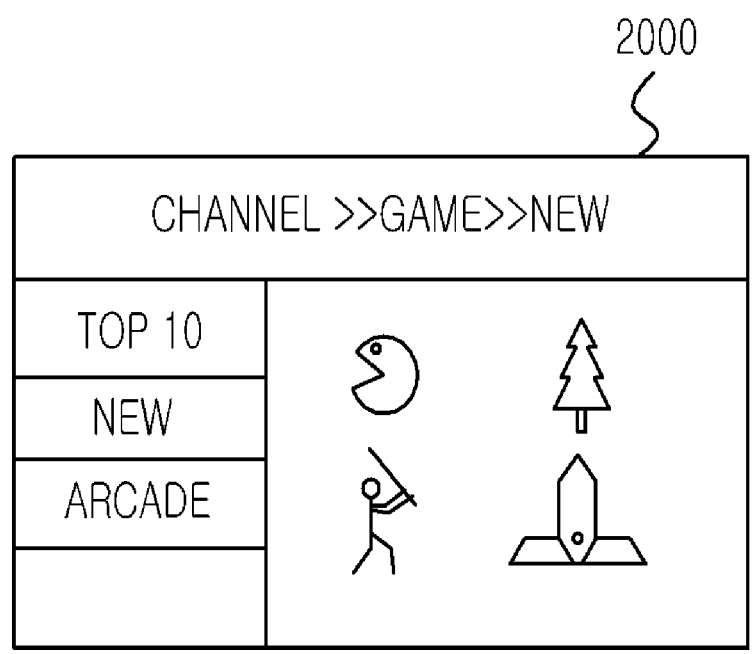

In an applied example, in the case that the segment is adjusted, a layout adjusted in each layer of a menu connected with the segment is different from each other. FIGS. 19 and 20 illustrate a screen on which a layout of a menu provided for a subscriber terminal belongs to same segment is displayed.

In addition, a view type corresponding to respective items of a menu is adjusted in accordance with apparatus information of a mobile terminal (S1150).

Additionally, the menu comprises a CP entry menu connected with storage position contents information of the contents and a directory menu with which position information of the contents is not connected. At this time, the layout is only adjusted in a directory menu, but a view type is adjusted also in a CP connection menu as well as the directory menu.

In addition, a character font of a layout of the menu can be adjusted by an operator in accordance with a position that the menu items are displayed on a screen of the mobile terminal.

Figure 12:
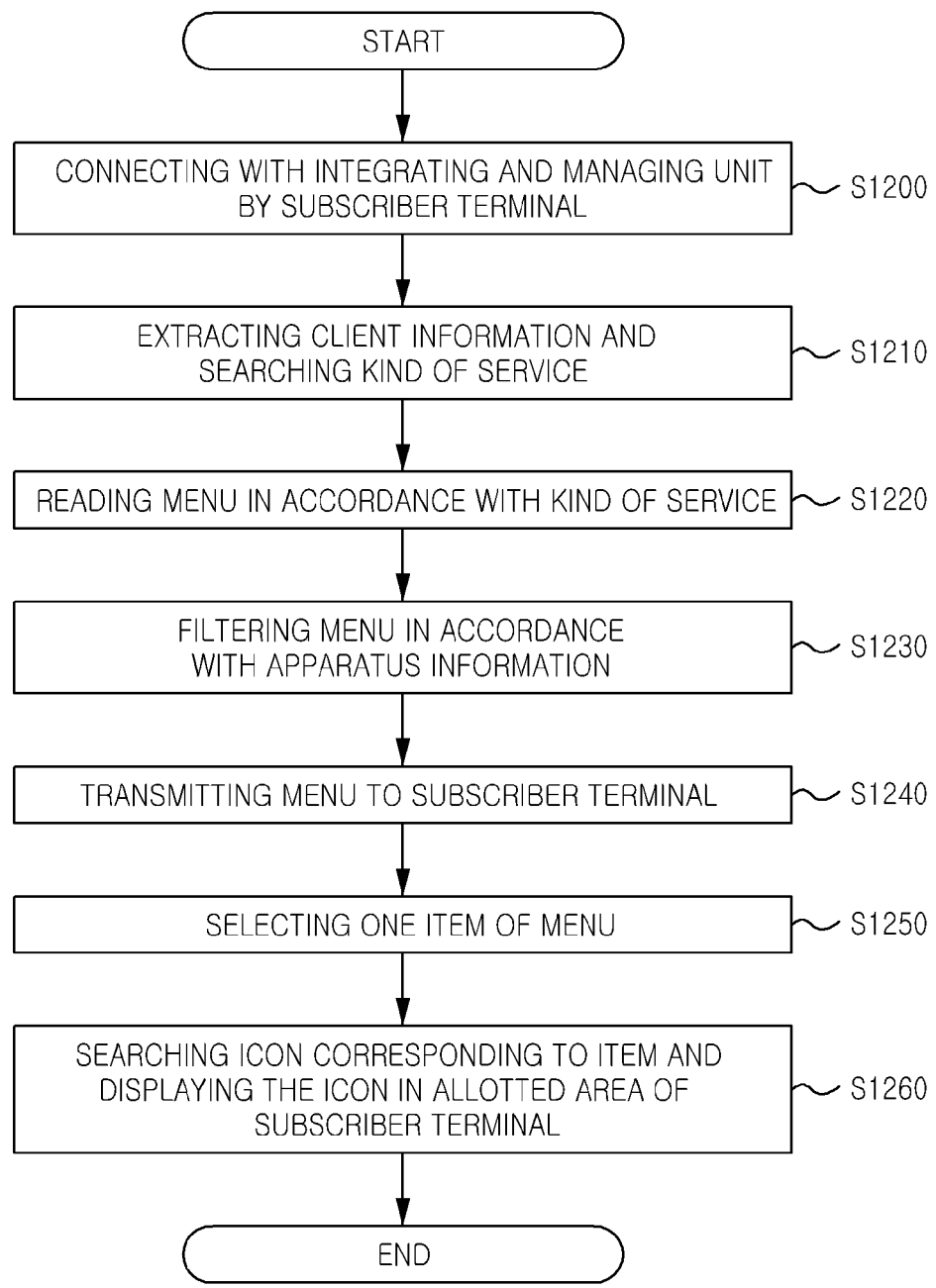

FIG. 12 is a flow chart illustrating a process for transmitting to the mobile terminal a menu adjusted in accordance with apparatus information of a mobile terminal.

In the case that the mobile terminal 100 is connected with the integrating and managing apparatus 200, a connection detection module 331 of the integrating and managing apparatus 200 detects apparatus information and subscriber information, and the basic information collection module 332 determines with what service the subscriber was affiliated from on the basis of subscriber information detected from the connection detection module 331 (S1200, S1210). Namely, the basic information collection module 332 determines to what segment group does the subscriber belong and from what segment group was the subscriber affiliated. And a menu supported in a segment and a segment group, which the subscriber is affiliated with, is read (S1220).

In the step (S1220), a menu (namely, a menu that can be displayed in the subscriber terminal) in accordance with apparatus information of the subscriber terminal of the read menus is filtered and then is transmitted to the mobile terminal (S1230, S1240).

At this time, in the case that any one of menus displayed in the mobile terminal is selected, icons corresponding to each item of the initial menu are searched (S1250).

Icons, except for an icon corresponding to the selected item of the icons corresponding to respective items of the initial menu, are displayed on an allotted area of the WAP page in the case that a low layer menu in accordance with the selected item is embodied in a WAP page (S1260).

Figure 13:
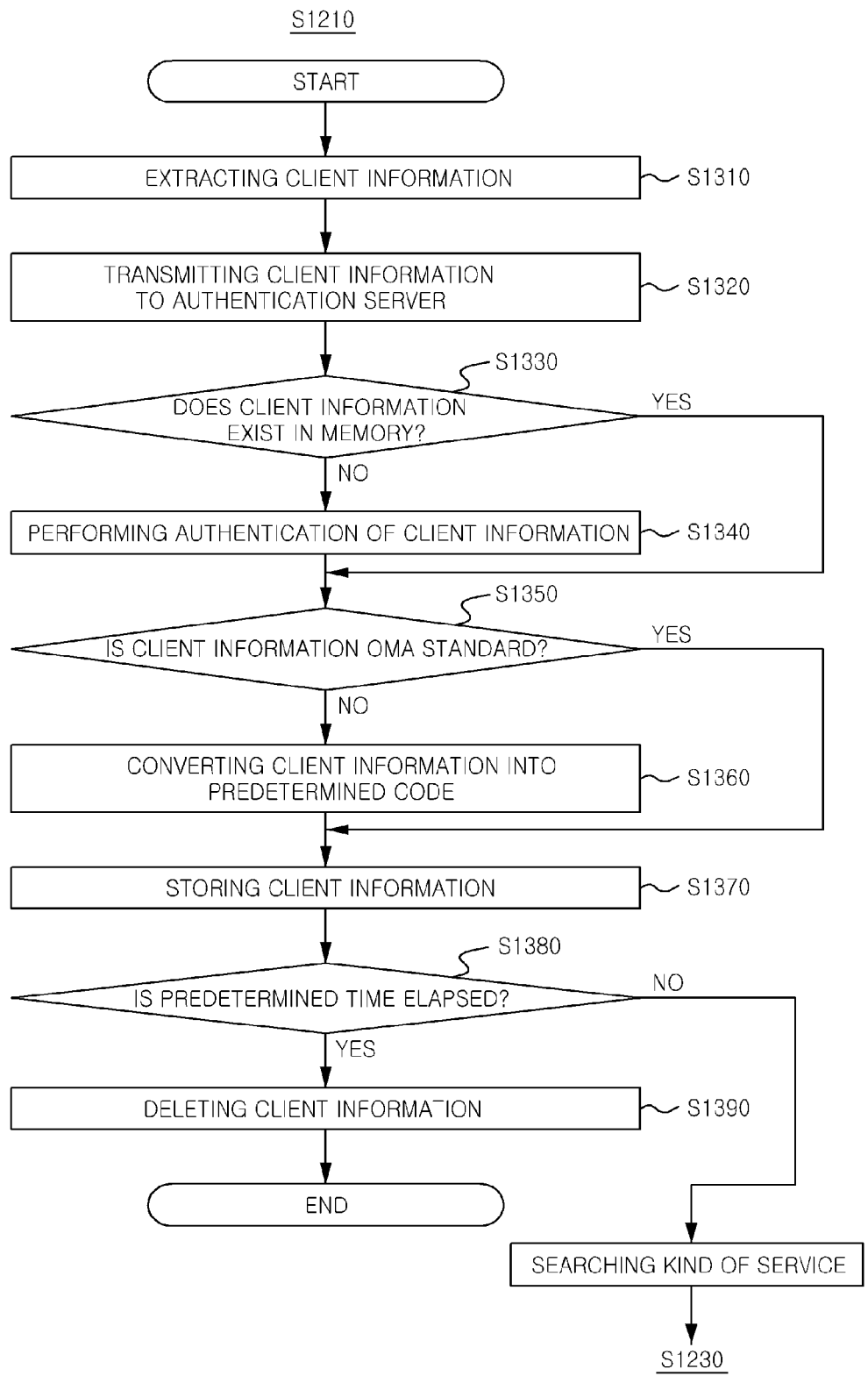

FIG. 13 is a flow chart illustrating a method for extracting subscriber information of the step (S1210) in FIG. 12.

The connection detection module 331 of the transmission unit 330 receives client information including subscriber information and apparatus information transmitted from a mobile terminal connected with the integrating and managing apparatus through the communication network 120, extracts subscriber information from the client information and then transmits the same to the authentication module 334 (S1310, 1320).

The authentication module 334 determines whether the client information is stored at a predetermined memory, and performs an authentication of the client information and storing then the authenticated client information at a predetermined memory in the case that the discriminating result doesn't satisfy the condition (S1330, S1340).

The authentication module 334 determines that a re-connection is performed by a user authenticated recently and enables the user to use a wireless internet connection without an authentication in the case that client information is stored at the memory. Accordingly, the client information automatically deleted in the case that a predetermined time has elapsed after the client information is stored (S1370, S1380, S1390).

In addition, the authentication module 334 determines whether the client information is not a form defined in an OMA standard (S1350).

The client information having a form defined in an OMA standard is a client ID, and the terminal information having a form defined in an OMA standard is a URI. A form defined in an OMA standard is formed as a predetermined code, and thus the subscriber information and the terminal information can be realized by only an equation decoding the code.

In conclusion, even though the subscriber information and the terminal information in itself following a form defined in an OMA standard are provided for the external contents providing terminal 150, an unnecessary release of the client information occurs.

Accordingly, the client information is stored exactly in the case that the subscriber information and the terminal information follow a form defined in an OMA standard. —The client information is converted into a predetermined code and is stored at the memory in the case that the subscriber information and the terminal information don't follow a form defined in an OMA standard (S1360, S1370).

Figure 14:
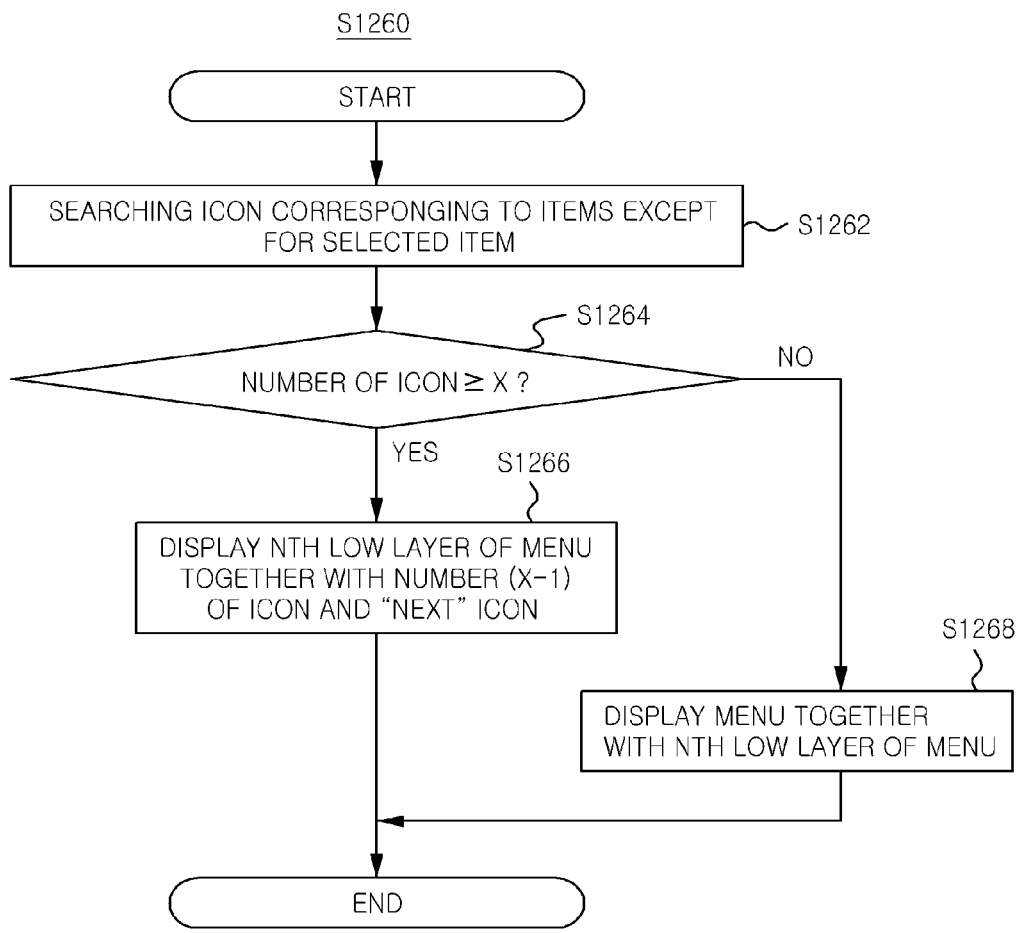

FIG. 14 is a flow chart for in detail explaining the step (S1260) in FIG. 12.

An icon corresponding to items except for items selected in the step (S1262) is searched (S1262). Items (namely, 1. a traffic item, 2. a travel item, 3. a stock item, 4. a bank item, 5. a shopping item, 7. a MSN item), except for the entertainment item (2550) are searched in the case that a specific item (2550) is selected.

The icon of icons are displayed in a predetermined position together with a low layer of a menu in the case that the number of the icon is under a predetermined number which can be displayed in an allotted area of a WAP page (S1264, S1268).

Herein, the number of the icons that can be displayed is adjusted differently in accordance with a screen size, namely, a size of LCD window.

Figure 26:
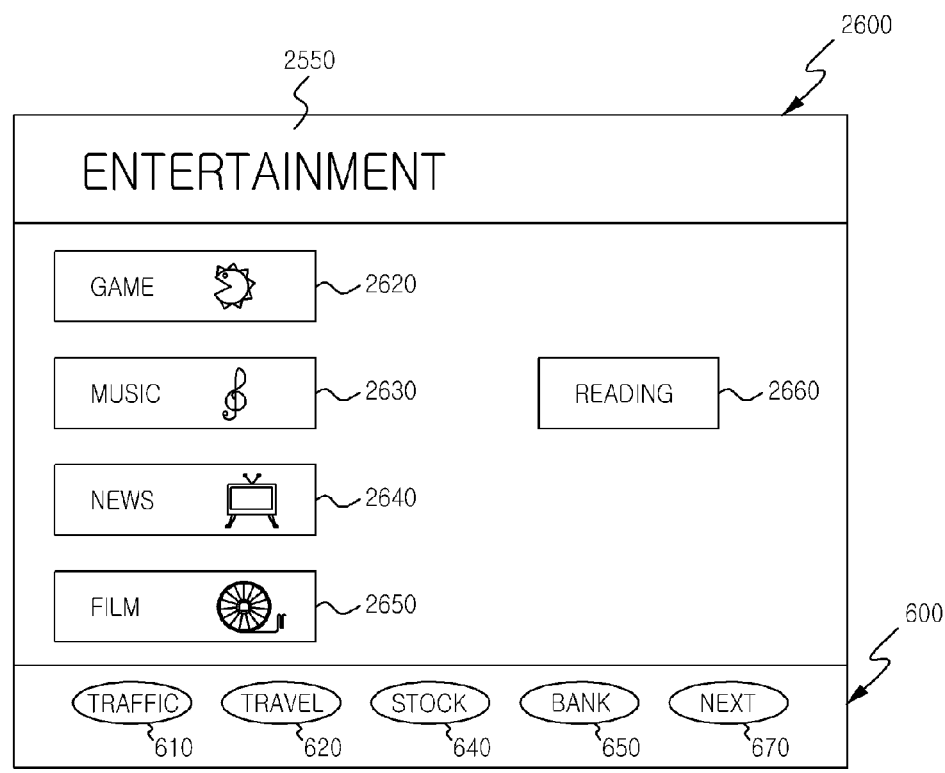

But in the case that the number of the icon is more than a predetermined number (X), only an icon, which has one less numbers (X−1) than the predetermined number and remaining mobile icons, is embodied in a predetermined position together with a next icon 670 as depicted in FIG. 26 and thus a move into icon, which can be displayed in a WAP page, can be embodied (S1266).

Figure 27:
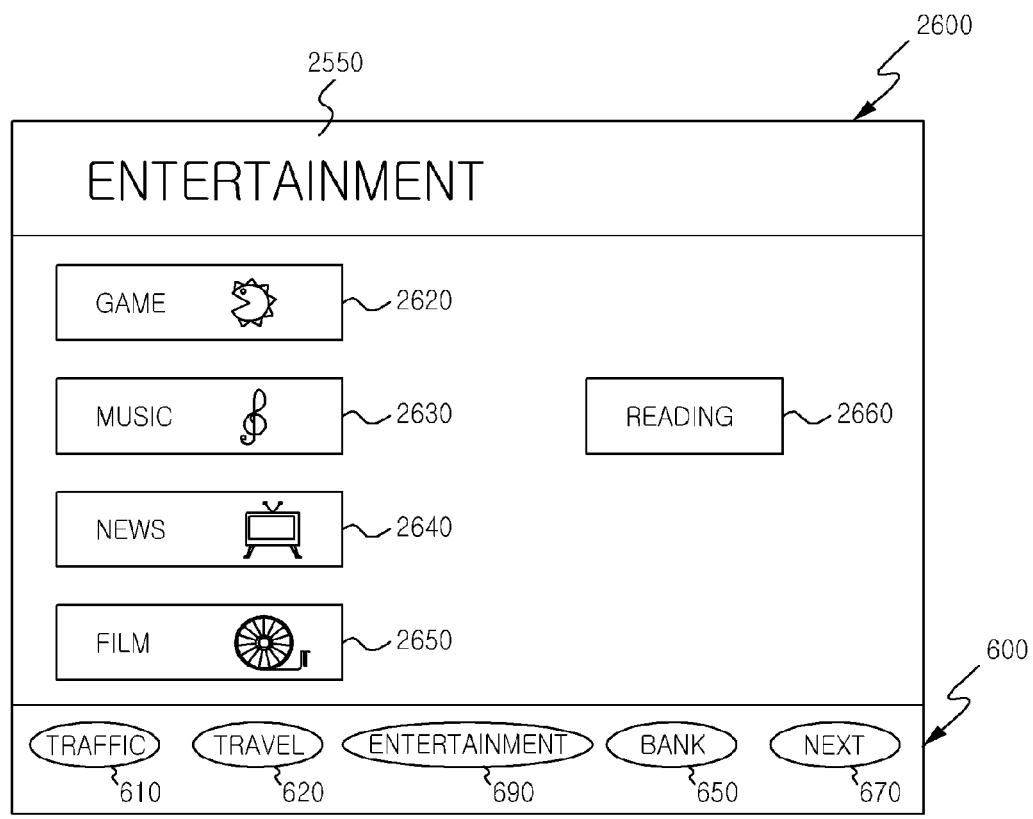

Preferably, as depicted in FIG. 27, a menu linked with items displayed on a screen of a mobile terminal at present is displayed together with icons corresponding to the initial menu. As an example, an icon 690 corresponding to an entertainment item can be displayed together with a traffic icon 610, a travel icon 620, a stock icon 640 and a next icon 670.

More preferably, the menu linked with items displayed on a screen of a mobile terminal at present is separately displayed so as to be different from the other items.

Figure 15:
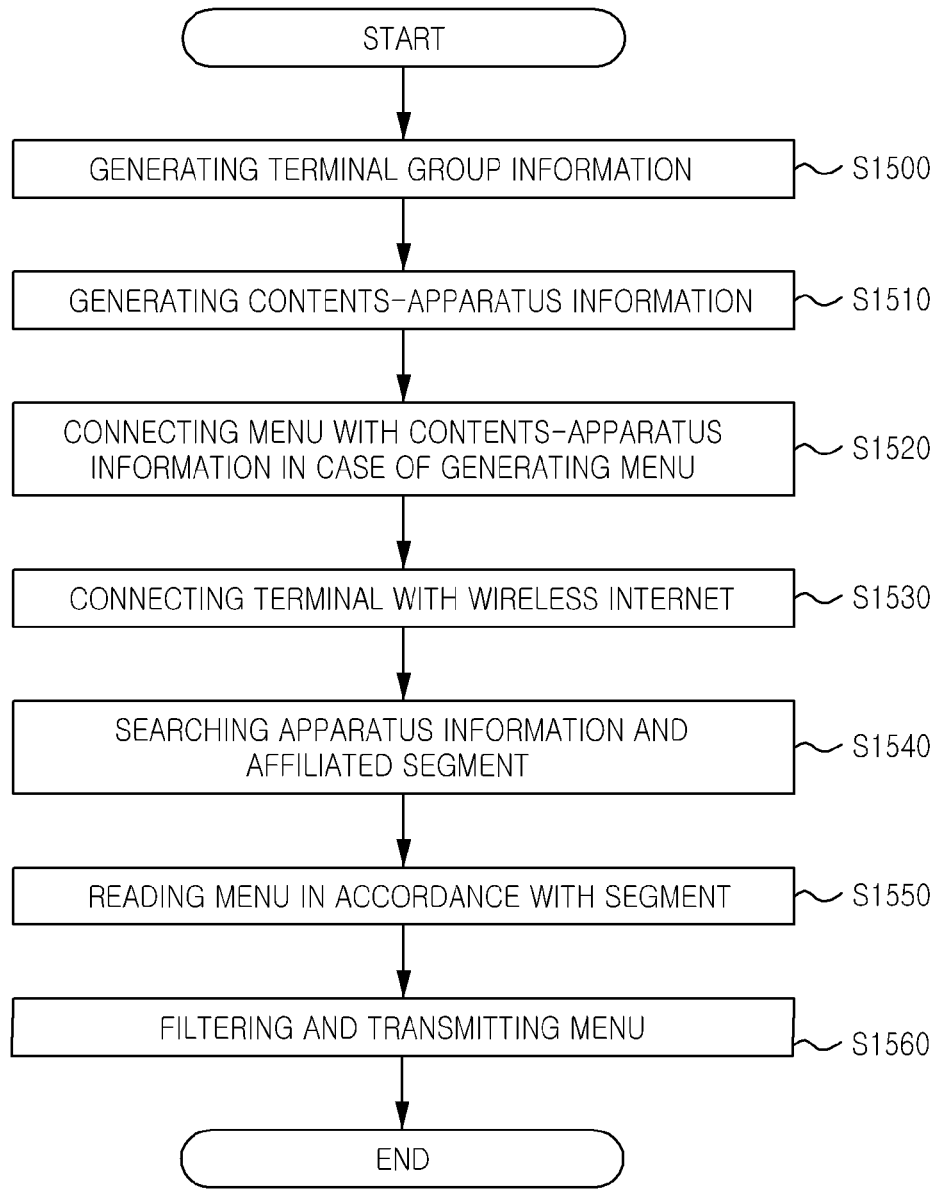

FIG. 15 is a flow chart illustrating a method for providing a menu according to apparatus information of a subscriber terminal in accordance with an embodiment of the present invention.

Terminal group information is generated by classifying apparatus information of the mobile terminal 100 in accordance with a predetermined rule (S1500).

The classification of the mobile terminal 100 in accordance with the predetermined rule is performed by a screen size of the mobile terminal, the number of a color supported from the mobile terminal, whether to be a mobile terminal having a camera or not, the number of a chord supported by sound of the mobile terminal and a memory built-in, etc, and can be modified by an operator.

Information of contents is registered through the contents management module 420 of the integrating and managing apparatus 200 in the case that a contents provider provides a service the mobile terminal 100 through the integrating and managing apparatus 200. Namely, a contents provider registers a URL (Uniform Resource Locater) on which the contents located together with a contents name or an ID. At this time, the contents provider also registers an option of a mobile terminal that the contents can be embodied.

Additionally speaking, contents-apparatus information of terminal group information generated in the step (S1500) is selected and then generated in case of registering the contents (S1510).

An operator generates a menu of a wireless internet to be provided for the mobile terminal 100 connected with the wireless internet. The menu comprises a directory menu with which a contents connection menu, which is position information, cannot be connected and a CP entry menu embodied so as to be connected with the contents connection menu.

A menu is provided in accordance with apparatus information by connecting a directory menu of the menus with the contents-apparatus information (S1520).

In the case that the mobile terminal 100 is connected with the integrating and managing apparatus 200, a connection detection module 331 of the integrating and managing apparatus 200 detects apparatus information and subscriber information (S1530).

The basic information collection module 332 discriminates what service was the subscriber affiliated from on the basis of subscriber information detected from the connection detection module 331 (S1540). Namely, the basic information collection module 332 discriminates what segment group does the subscriber belong to and what segment group was the subscriber affiliated from. And a menu supported in a segment and a segment group, which the subscriber is affiliated with, is read (S1550).

A rendering module 333 of the transmission unit 330 filters a menu matched with apparatus information detected from the connection detection module 331 of the menus read in step (S1550) and then transmits the same to the mobile terminal 100 (S1230, s1240).

Figure 16:
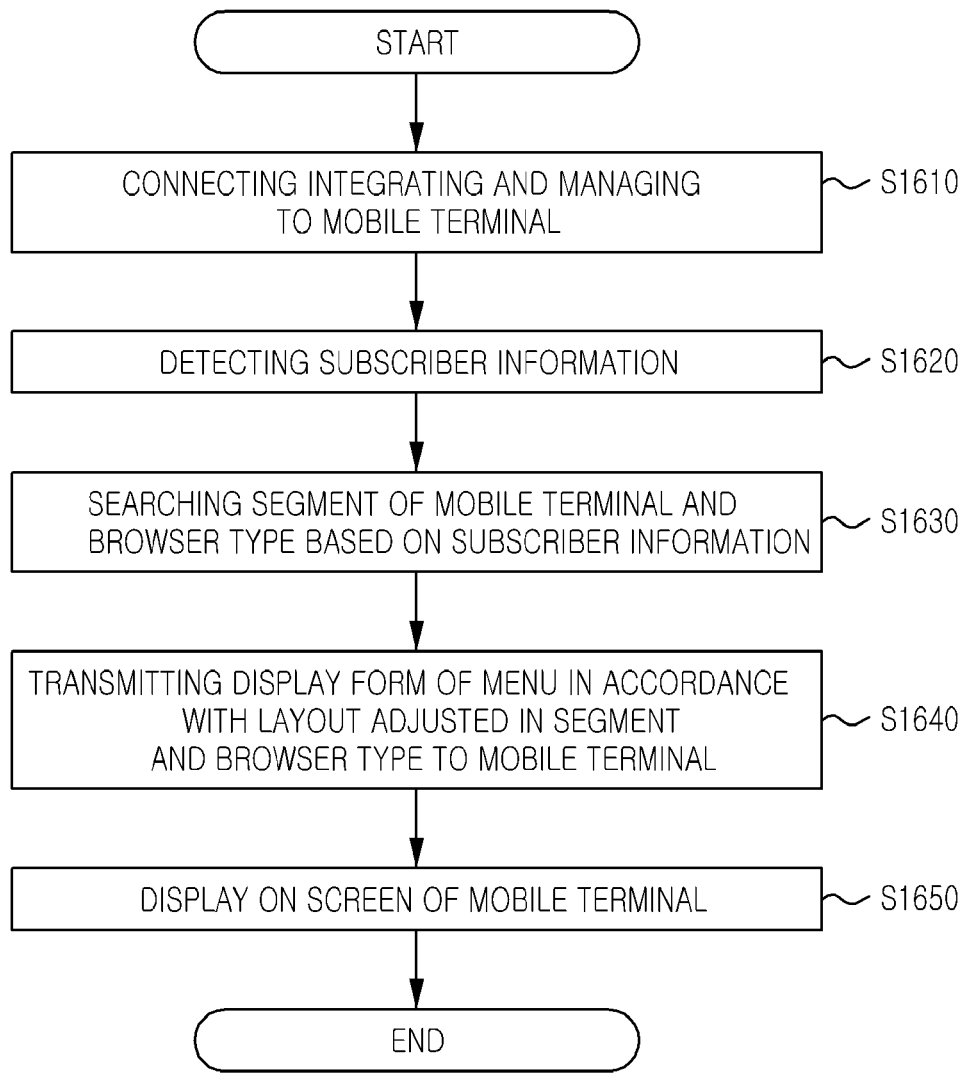

FIG. 16 is a flow chart illustrating a method for providing a menu having a predetermined view type for a mobile terminal connected with a wireless internet in accordance with an embodiment of the present invention.

The connection detection module 331 of the transmission unit 330 detects the subscriber information in the case that the mobile terminal connects with an integrating and managing apparatus 200 for managing an operation of a wireless internet (S1610, S1620).

With what segment is the mobile terminal affiliated and a browser type of the mobile terminal is searched (S1630). Namely, because menus provided for a mobile terminal from each segment is different from each other, a process for searching what segment is the mobile terminal affiliated with is requested.

In the case that a specific segment that the mobile terminal is affiliated with is detected, a layout adjusted in the segment and a menu provided from the segment are read.

A rendering module 333 of the transmission unit 330 reconstructs a menu provided from the segment based on the menu, a layout of the menu and a view type of the menu and then transmits the same to the mobile terminal 100. The transmitted menu is displayed on a screen of a mobile terminal (S1650).

The browser type includes a browser for a text (1.x) supporting a text and a browser for a multimedia (Next Generation Browser) supporting multimedia contents.

Figure 9:
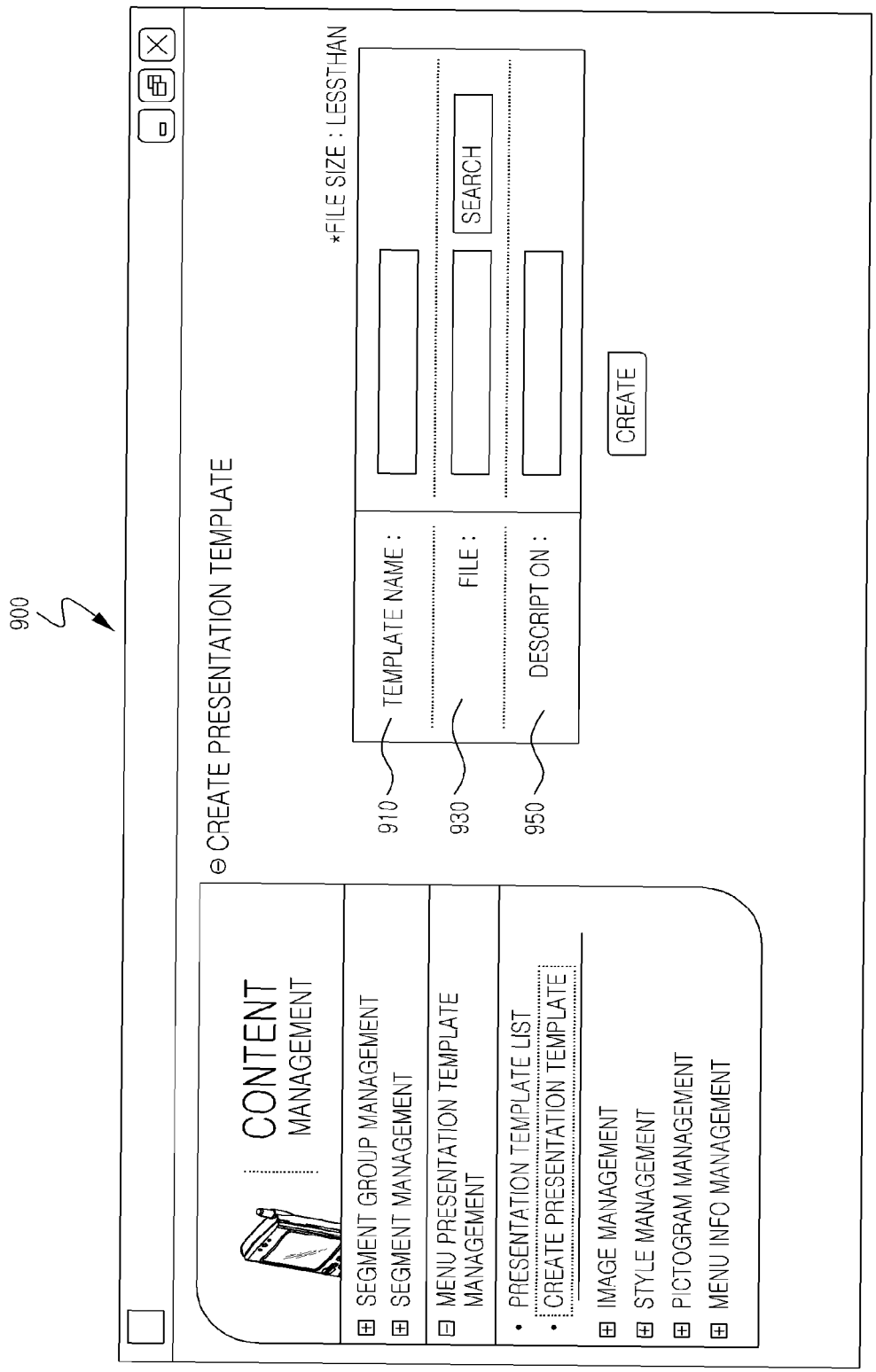
Figure 10:
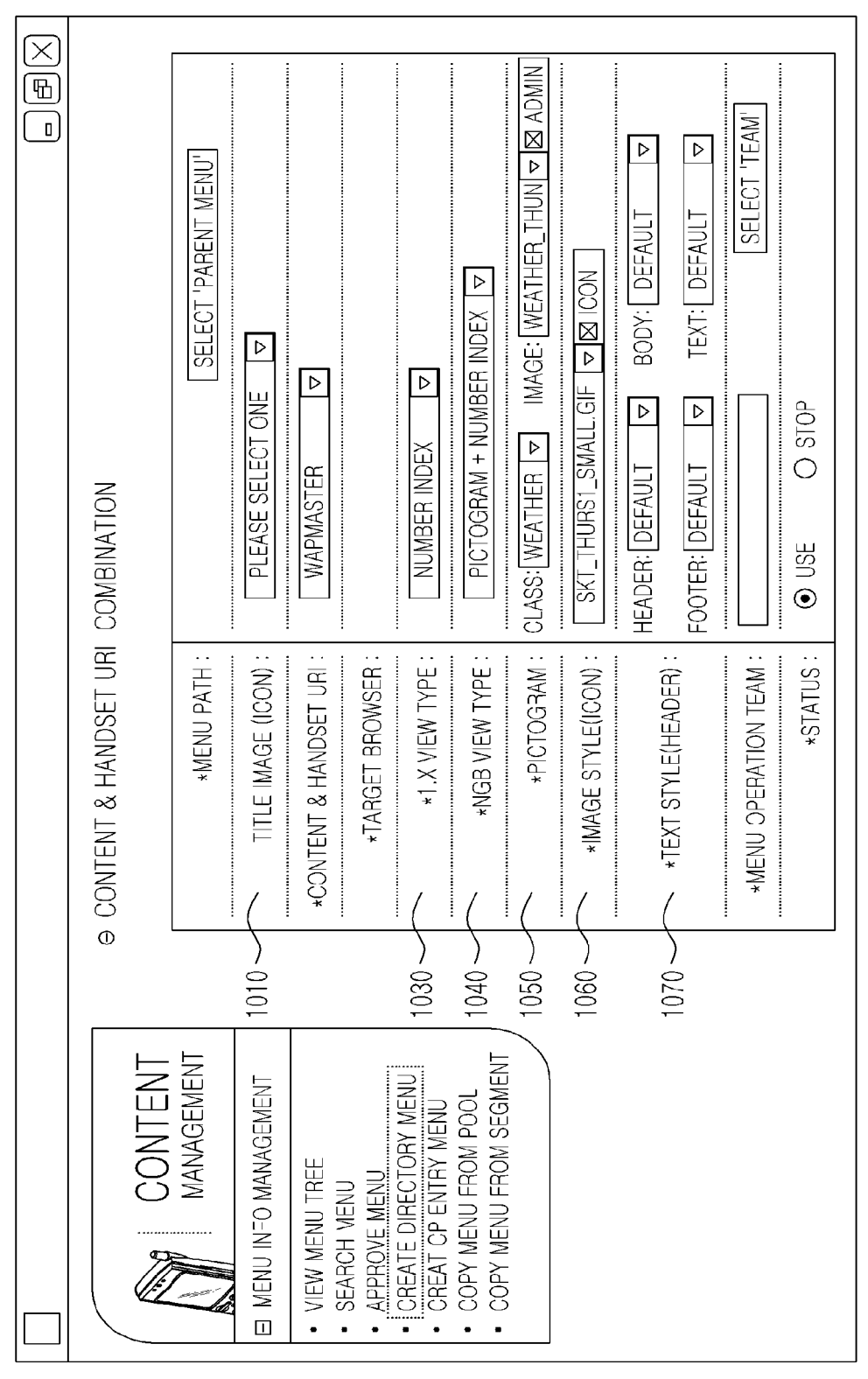

FIGS. 9 and 10 illustrate an interior block diagram of a web page for deciding a layout and a view type of a menu provided for a mobile terminal in accordance with an embodiment of the present invention, and FIGS. 19 through 24 illustrate an exemplary menu provided for a mobile terminal in accordance with an embodiment of the present invention Referring to a web page depicted in FIG. 9, a layout of a menu provided by an operator of menus displayed in a mobile terminal is decided. The layout of a menu is differently adjusted in accordance with each low layout provided by the operator.

A main menu provided by an operator is displayed in a mobile terminal as a layout depicted in FIG. 19 in the case that the mobile terminal connects with an integrating and managing apparatus 200 for managing an operation of a wireless internet. At this time, a menu is displayed in a mobile terminal as a layout depicted in FIG. 20 in the case that a game item is selected. In addition, a menu is displayed in a mobile terminal as a layout depicted in FIG. 24 in the case that a music item is selected in FIG. 19

For the convenience of an explanation of the present invention, a layout, which respective items are arranged with an icon form as depicted in FIG. 19, will be named as a first template, a layout, which a menu is formed in a left side of a screen and a low menu of a menu selected in a right side of the screen or a content thereof is arranged as a layout depicted in FIG. 20, will be named as a second template, a layout arranged as a sheet form as depicted in FIG. 24 will be named as a third template.

The first and the third template are stored as a predetermined file. An operator inputs a layout name (namely, a template name; 910) of a menu in a web page of FIG. 9, designates a template file 930 to be selected and inputs a simple explanation of the layout.

Referring to FIG. 10, the method how a view type of a menu is adjusted can be realized. Specifically speaking, a view type of a menu title is adjusted through a selection window 1010 in a web page of FIG. 10.

Accordingly, various view types such as an image title like a selection window 1900 in a web page of FIG. 19, a type title displaying a menu path like a selection window 2000 in a web page of FIG. 19 and icon title like a selection window 1310 in a web page of FIG. 23, etc., are embodied.

In addition, a type method of a menu item in accordance with a browser is adjusted through a web page of FIG. 10. A reference numeral 1030 is an item adjusting a view type in the case that a browser of a mobile terminal is a browser for text. A view type supported in case of being a browser for text includes a text, an index and an index under bar, etc.

In addition, a reference numeral 1040 is an item adjusting a view type in the case that a browser of a mobile terminal is a browser for supporting multimedia content. A view type in accordance with the item includes a text, an index, an index under bar and a pictogram, etc.

And a type of an icon displayed in a menu is adjusted by a reference numeral 1060.

Furthermore, a character font can be adjusted and a character of the total menu is identically adjusted in accordance with a position displayed in the menu. A character font can be differently adjusted in accordance with a character position (namely, whether the character is located on a high end or whether the character is located on a low end, and whether the character is for a text) displayed in the menu (see a reference numeral 1070 in FIG. 10).

Figure 17:
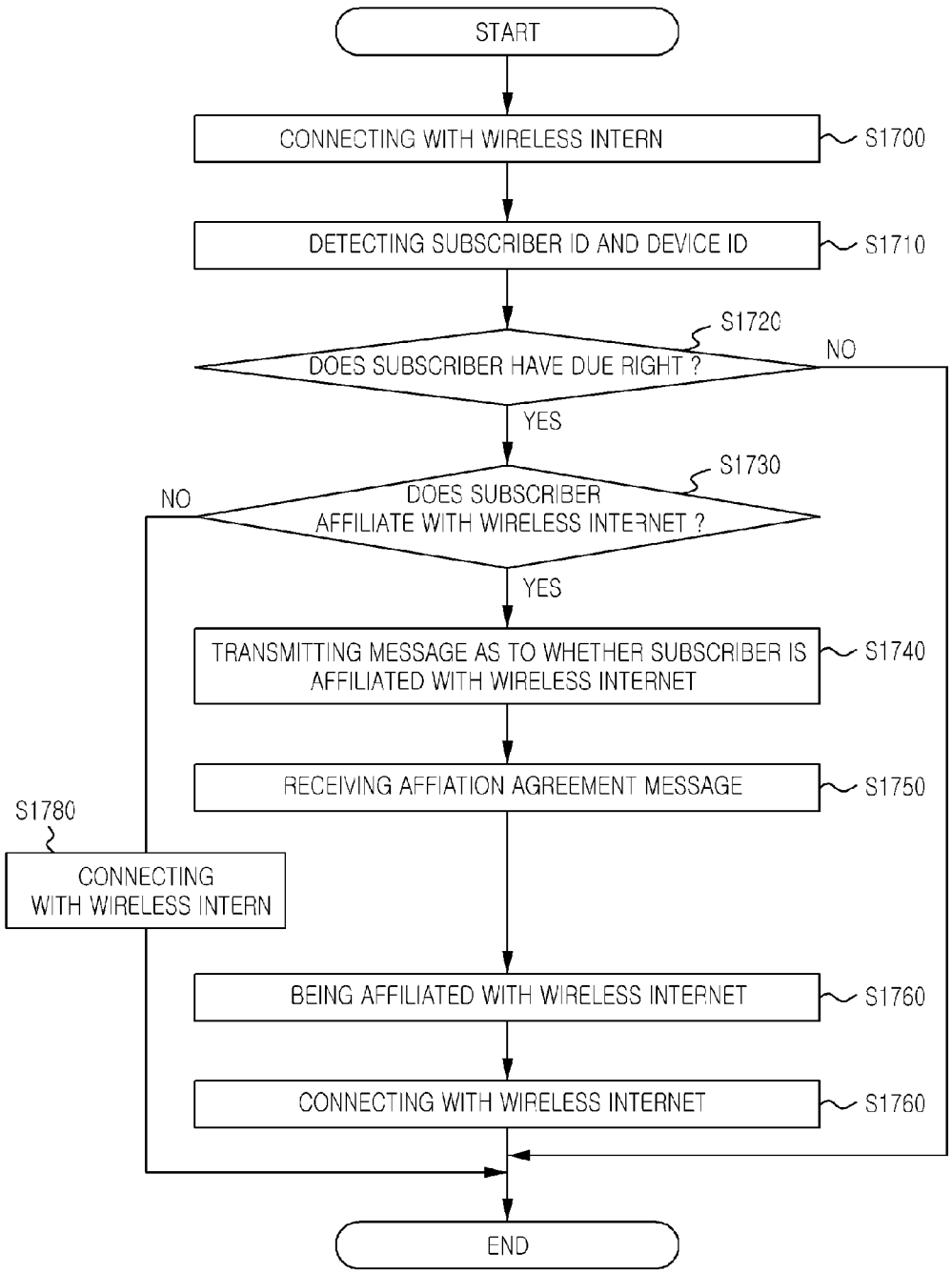

FIG. 17 suggests a process enabling a client to automatically be affiliated with a wireless internet provider in the case that the client is a subscriber of a mobile communication network or a wire network but is not affiliated with the wireless internet.

The transmission unit 300 of the integrating and managing apparatus 200, which is a portal platform for managing an operation of a wireless internet connection and a wired internet connection, detects subscriber information and apparatus information of the subscriber terminal 100 in the case that a subscriber terminal 100 accesses a wireless internet connection (S1700, S1710).

Particularly explaining, the connection detection module 331 of the transmission unit 330 detects subscriber information and apparatus information of the subscriber terminal 100. At this time, the subscriber information includes an MN, an MDN and client information, and the apparatus information is a phone type or a URI.

After the connection detection module 331 detects the subscriber information, the authentication module 334 of the transmission unit 330 performs an authentication for determining whether the subscriber has authentication privileges or not (S1720).

An operator or a manager decides a standard for determining whether the subscriber has authentication privileges or not. Namely, as one example, a subscriber having authentication privileges in accordance with the present invention is one who was affiliated with a mobile communication network service and the subscriber by who a billing of last service fee was normally processed.

In the step (S1720), whether the subscriber is registered to a wireless internet provider is requested to the subscriber management unit 500 in the case that the subscriber of a mobile terminal 100 connected with a wireless network is a subscriber with authentication privileges (S1730).

The subscriber terminal is accessed through a wireless internet provider in the case that the subscriber registered to a wireless internet provider in the step (S1730).

A WAP page including an inquiry message as to whether to be affiliated with a wireless internet is transmitted to the subscriber terminal 100 in the case that the subscriber terminal 100 is not registered to a wireless internet according to a searching result using the WAP management module of the subscriber management unit 500 (S1750).

The subscriber terminal 100 transmits an agreement message of an affiliation with a wireless internet provider to the subscriber management unit 500 in the case that a user of the subscriber terminal 100 selects an identification icon 410 in the WAP page (S1760).

The subscriber management unit 500 approves an affiliation with a wireless internet provider using subscriber information and apparatus information detected from the connection detection module 331 of the transmission unit 330 and transmits the subscriber information and the apparatus information to the WAP subscriber management module in the case that a terminal of the subscriber receives an agreement message of an affiliation with a wireless internet provider (S1770).

A user ID, a password in accordance the user ID, terminal information, a social security number, an address and a real name, etc., are examples of registration information basically requested in case of being affiliated with a wireless internet provider. However, only subscriber information and apparatus information are inputted as registration information through the above explanation, and the subscriber is registered by filling the other pieces of information with a provisional data in the subscriber management unit 500.

Figure 18:
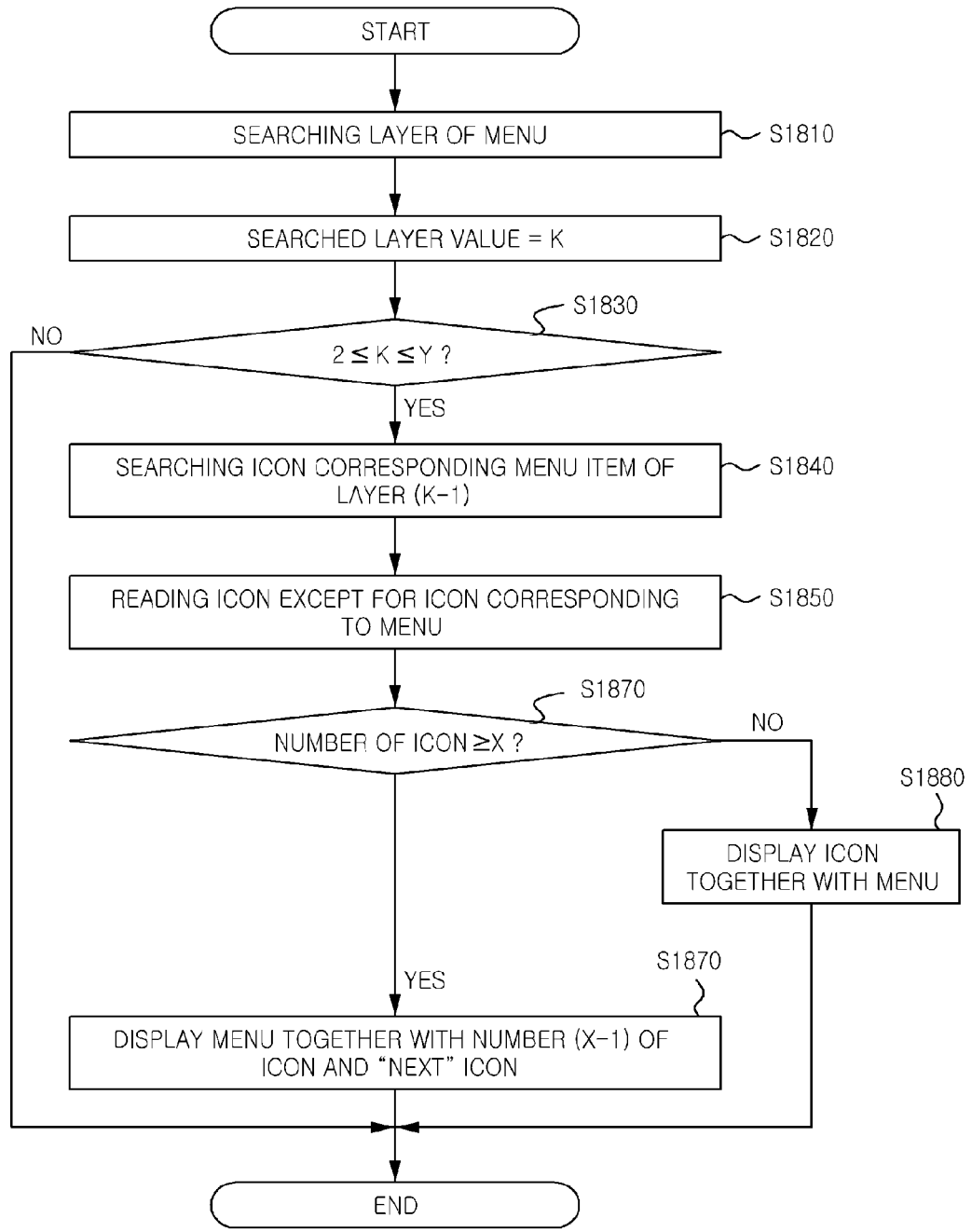

FIG. 18 is a flow chart illustrating a composition method of a menu provided for a mobile terminal in accordance with an embodiment of the present invention A layer of a menu is searched in the case that the menu is transmitted to a mobile terminal connected with a wireless internet (S1810).

A layer value of the searched menu is adjusted as "X" (S1820).

Whether a layer value (K) of the searched menu is more than a second layer and belongs to a last layer (Y) provided by an operator is discriminated (S1830). At this time, a layer value provided by the operator is adjusted as $$2<K<Y \qquad \text{Equation 11}$$

Icons corresponding to menu items of a high layer are searched in the case that a layer value of the searched menu satisfies the equation 1 (S1840).

How many icons exist is discriminated by reading icons except for an icon linked with the menu of menu items of the high layer (S1850).

All icons are embodied in a predetermined position in the case that the number of the icon is under a predetermined number (X) (S1880). Namely, all icons are displayed in a low end in the case that the number of the icon is under a predetermined number (X).

But an icon (X−1) number and a next icon are embodied in view of the space constraints for embodying all icons in a predetermined position of the WAP page in the case that the number of the icon is more than a predetermined number (X) (S1870).

In the case that the menu is a last layer provided by an operator (namely, K=Y), even though any one of an item of the menu is selected, an icon search corresponding to items except for the selected item is not performed.

In addition, it is preferable that a menu linked with items displayed on a screen of a present mobile terminal is displayed together with icons corresponding to the most significant menu.

It is more preferable that a menu is distinctively displayed unlike other icons for displaying the menu linked with items displayed on a screen of a present mobile terminal.

While the invention is capable of various modifications and alternative forms, specific embodiments thereof have been shown by way of example in the drawings and are herein description in detail. It should be understood, however, that the description herein of specific embodiments is not intended to limit the invention to the particular forms disclosed, but on the contrary, the invention is to include all modifications, equivalents and alternatives falling within the spirit and scope of the invention as defined by the appended claims.

INDUSTRIAL APPLICABILITY

The present invention provides a user with content in accordance with an efficient mobile terminal in a mobile communication providing a wireless internet service.

The invention claimed is:

1. An apparatus for providing contents in a mobile communication system, the apparatus comprising:
a contents provider access unit configured to
respond to an inquiry request related to one of a plurality of services, each of the plurality of services utilizing a corresponding one of a plurality of contents providing terminals connected to the contents provider access unit through a communication network and
manage one or more rules related to the plurality of contents providing terminals, a connection, and one or more requests of the plurality of contents providing terminals;
a central management unit configured to manage the plurality of services, a subscriber affiliated with the one of the plurality of services, apparatus information of a subscriber terminal and an operation and an authentication of the one of the plurality of services, wherein the apparatus information includes to which user the subscriber terminal belongs, and wherein the management of the central management unit is based on data inputted from the corresponding one of the plurality of contents providing terminals connected through the contents provider access unit;
a transmission unit configured to
receive terminal information of the subscriber affiliated with the one of the plurality of services,
transmit a menu of the one of the plurality of services, and
transmit contents in accordance with terminal information of the subscriber affiliated with the one of the plurality of services; and
an interface unit configured to be connected with an external server associated with one of the plurality of services,
wherein the transmission unit comprises:
a transmission management unit configured to obtain client information of the subscriber terminal, authenticating the client information, extracting the apparatus information from the client information, and provide the central management unit with the client information; and
a transmission channel unit configured to provide the authenticated subscriber terminal with the menu generated in accordance with the apparatus information and the contents,
wherein the transmission management unit comprises:
a connection detection module configured to detect the apparatus information and subscriber information of the subscriber terminal connected with a wireless internet;
a basic information collection module configured to check one of the plurality of services and a supported menu in accordance with the one of the plurality of services; and
a rendering module configured to filter the supported menu in accordance with the apparatus information and then configured to transmit the filtered menu to the subscriber terminal, and
wherein the central management unit comprises a subscriber management unit configured to automatically get the subscriber terminal registered to a wireless internet by enabling the subscriber terminal to receive a wireless internet registration request in the case that the subscriber is affiliated with a wire communication network or a wireless communication network by searching the one of the plurality of subscriber services in accordance with an inquiry message transmitted from an authentication module of the transmission management unit,
wherein the subscriber management unit is configured to transmit at least one of a predetermined provisional data, the subscriber information, or the apparatus information of the subscriber terminal in response to a request of inputting personally identifiable information in case of being affiliated with the wireless internet, and
wherein the predetermined provisional data fills data for affiliating except for the subscriber information and the apparatus information of the subscriber terminal of data requested in case of being affiliated with wireless internet.

2. The apparatus according to claim 1, wherein the contents provider access unit is configured to perform authentication of the one of the plurality of contents providing terminals in accordance with one of the one or more rules, the one of the one or more rules corresponding to the one of the plurality of contents providing terminals.

3. The apparatus according to claim 1, wherein the transmission management unit further comprises an authentication module for performing an authentication based on the client information, and storing the client information for a predetermined period of time after client information is authenticated.

4. The apparatus according to claim 3, wherein the authentication module omits the performance of the authentication of the client information in the case that the client information is stored at a predetermined memory.

5. The apparatus according to claim 4, wherein the client information is stored at the predetermined memory for the predetermined period of time.

6. The apparatus according to claim 4, wherein the subscriber information is any one of an MIN (Mobile Identification Number), an MDN (Mobile Directory Number) and client information, and the apparatus information is a phone type or a URI (Unique Resource Identity).

7. The apparatus according to claim 1, wherein the transmission management unit further comprises an encryption module for converting the subscriber information and the apparatus information into a predetermined format in the case that the subscriber information and the apparatus information are not in a formation defined in an OMA (Open Mobile Alliance) standard.

8. The apparatus according to claim 7, wherein the predetermined format is generated using a plug-in method.

9. The apparatus according to claim 1, wherein the transmission management unit provides a history menu of the subscriber terminal according to a stored menu previously selected by the subscriber terminal.

10. The apparatus according to claim 1, wherein the transmission channel unit comprises a wireless subscriber channel for communicating with the subscriber terminal through a wireless network.

11. The apparatus according to 1, wherein the transmission channel unit further comprises a wire subscriber channel for communicating with the subscriber terminal through a wire network.

12. The apparatus according to 1, wherein the transmission channel unit further comprises a connection gateway for generating a predetermined cookie based on the apparatus information of the client information of the subscriber terminal connected through a wireless network and performing a user agent processing for protecting the client information.

13. The apparatus according to claim 1 wherein the central management unit further comprises:

an apparatus information management unit configured to generate terminal group information by classifying the apparatus information of the subscriber terminal in accordance with a predetermined rule; and a service management unit for connecting contents-apparatus information with a menu item and storing the same in case of generating a menu of a wireless internet to be provided to the subscriber terminal by connecting contents with corresponding terminal group information and generating the contents-apparatus information when contents to be provided with the subscriber terminal are stored.

14. The apparatus according to claim 13, wherein the service management unit further comprises:

a segment management module for managing a segment for providing contents with the subscriber terminal in accordance with another predetermined rule by an operator and adjusting a layout of the menu in the segment;

a menu management module for adjusting a browser type of the subscriber terminal and a view type of the menu item; and a rendering module, wherein the rendering module transmits the menu in accordance with the apparatus information to the subscriber terminal by enabling the subscriber terminal to receive the menu corresponding to the segment and to receive the apparatus information from the apparatus information management unit.

15. The apparatus according to claim 14, wherein the rendering unit stores a predetermined program for displaying respective items of the menu as any one of a text type, an index type, an index under bar type and a pictogram type in accordance with the apparatus information.

16. The apparatus according to claim 15, wherein the central management unit further comprises a search engine, wherein the search engine generates a WAP page for the subscriber terminal provided for checking the service or contents using the subscriber terminal and transmits the WAP page to the subscriber terminal through the transmission unit.

17. The apparatus according to claim 16, wherein the search engine stores a predetermined code in accordance with the WAP page, and transmits the WAP page in accordance with the code to the subscriber terminal in the case that the predetermined code is inputted from the subscriber terminal.

18. The apparatus according to claim 1, wherein the central management unit does a grouping a service in accordance with a kind of service by a request of the contents provider and manages the same.

19. The apparatus according to claim 1, wherein the central management unit further comprises at least one of a contents providing terminal configured to group the plurality of services and to register the same in accordance with a corresponding kind of the plurality of services, to store and manage contents in accordance with the plurality of services and to provide the contents in accordance with a request of the subscriber terminal affiliated with the one of the plurality of services.

20. The apparatus according to claim 19, wherein a predetermined plug-in is provided to the one of the plurality of contents providing terminals in the case that the one of the plurality of contents providing terminals is connected.

21. The apparatus according to claim 1, wherein the interface unit comprises:

an interface connection unit for directly being connected with an external server by having a protocol in accordance with the external server and transmitting and receiving a predetermined data; and an interface management for managing a configuration of the external server.

22. The apparatus according to claim 21, wherein the interface unit is configured to periodically provide the external server, which is a billing server, with billing data and to store and manage the billing data according to a service rule in the case that the interface unit services a short message, wherein the short message is received through connection with a short message service server.

23. The apparatus according to claim 21, wherein the interface unit for periodically providing the billing server with the billing data by storing and managing the billing data according to providing a predetermined service or contents generated in accordance with the service rule in the case that the interface unit provides the predetermined service or the contents in accordance with a service provision request of the authenticated subscriber terminal.

24. An apparatus for providing contents in a mobile communication system, the apparatus comprising:

a connection detection module configured to extract subscriber information and apparatus information from a mobile terminal connected through a wireless communication network and transmitting the same;

an authentication module configured to
receive client information, determine if the client information is stored in a predetermined memory,
perform an authentication process after it is determined that the client information is not stored in the predetermined memory, and
store the client information in the predetermined memory for a predetermined period of time;

a subscriber management module configured to
cause a subscriber terminal registered to a wireless internet by enabling the subscriber terminal to receive a wireless internet registration request in the case that it is determined by the authentication module that a subscriber associated with the subscriber terminal is affiliated with a subscriber service, and
transmit at least one of a predetermined provisional data, the subscriber information, or an apparatus information of the subscriber terminal in response to a request of inputting personally identifiable information in case of being affiliated with the wireless internet; and a transmission management unit which includes an encryption module configured to convert the subscriber information and the apparatus information into a predetermined code in the case that the subscriber information and the apparatus information is not in a formation defined in an OMA (Open Mobile Alliance) standard, wherein the authentication module is configured to omit the performance of the authentication of the client information in the case that the client information is stored in the predetermined memory, wherein the predetermined provisional data fills data for affiliating except for the subscriber information and the apparatus information of the subscriber terminal of data requested in case of being affiliated with wireless internet.

25. The apparatus according to claim 24, wherein the client information is stored at the predetermined memory for the predetermined period of time.

26. The apparatus according to claim 25, wherein the subscriber information is any one of an MIN (Mobile Identification Number), an MDN (Mobile Directory Number) and client information, and the apparatus information is a phone type or a URI (Unique Resource Identity).

27. A method for providing contents in a mobile communication system, the method comprising the steps of:
- W-1) extracting subscriber information from client information of a mobile terminal connected with a wireless internet connection;
- W-2) generating an authentication result by performing authentication of the subscriber information;
- W-3) transmitting an inquiry message as to whether to be affiliated with a wireless internet provider to the mobile terminal when the authentication result generated in the step (W-2) indicates that a subscriber associated with the subscriber information has authentication privileges but didn't register to the wireless internet provider; and
- W-4) affiliating the mobile terminal with the wireless internet provider in response to an agreement message of an affiliation with the wireless internet provider from the mobile terminal,
- wherein in the step (W-4), predetermined provisional data fills data for affiliating except for the subscriber information and apparatus information of the mobile terminal of data requested in case of being affiliated with the wireless internet provider.

28. The method according to claim 27, wherein the authentication privileges are affiliated with at least one of a wireless communication network service and a wired internet service designated by an operator of the mobile communication system.

29. The method according to claim 28, the method further comprising a step of:
- W-5) affiliating the mobile terminal with the wireless internet provider when the authentication result indicates that the subscriber has the authentication privileges and registered to the wireless internet provider.

30. An automatic authentication method in a wireless internet, the method comprising the steps of:
- Q-i) connecting a mobile terminal with a proxy server for connecting with a wireless internet through a wireless communication network;
- Q-ii) extracting client information including apparatus information and subscriber information from the mobile terminal connected with the central management unit and then transmitting the client information to an authentication server;
- Q-iii) determining whether the client information is stored in a predetermined memory;
- Q-iv) after it is determined that the client information is not stored in the predetermined memory in the step (Q-iii), performing an authentication of the client information and storing the authenticated client information at the predetermined memory;
- Q-v) omitting the performance of the authentication of the client information after it is determined that the client information is stored in the predetermined memory in the step (Q-iii);
- Q-vi) deleting the client information from the predetermined memory after the client information is stored in the predetermined memory for a predetermined period of time;
- Q-vii) determining whether the subscriber information and the apparatus information is in a formation defined in an OMA (Open Mobile Alliance) standard; and
- Q-viii) converting the subscriber information and the apparatus information into a predetermined code after it is determined that the subscriber information and the apparatus information is not in a formation defined in the OMA (Open Mobile Alliance) standard in the step (Q-vii),
- wherein in the step (Q-iv), a predetermined provisional data fills the client information for performing the authentication except for the subscriber information and the apparatus information of the mobile terminal of data requested in case of being affiliated with wireless internet.

31. The method according to claim 30, wherein the client information is any one of an MIN (Mobile Identification Number), an MDN (Mobile Directory Number) and client information.

32. The method according to claim 30, wherein the apparatus information is a predetermined file including a URI (Unique Resource Identity), a phone type and a browser type.

* * * * *